United States Patent
Ruuska et al.

(10) Patent No.: US 7,515,945 B2
(45) Date of Patent: Apr. 7, 2009

(54) CONNECTED MODE FOR LOW-END RADIO

(75) Inventors: Päivi M. Ruuska, Tampere (FI); Antti Lappeteläinen, Espoo (FI); Jukka Reunamäki, Tampere (FI); Juha Salokannel, Kangasala (FI)

(73) Assignee: Nokia Corporation, Epsoo (FI)

( * ) Notice: Subject to any disclaimer, the term of this patent is extended or adjusted under 35 U.S.C. 154(b) by 1224 days.

(21) Appl. No.: 10/610,990

(22) Filed: Jun. 30, 2003

(65) Prior Publication Data

US 2004/0266494 A1    Dec. 30, 2004

(51) Int. Cl.
   *H04B 1/00*    (2006.01)
   *H04L 12/42*   (2006.01)

(52) U.S. Cl. .................. 455/574; 455/41.2; 455/41.3

(58) Field of Classification Search ............ 455/574, 455/41.2, 41.3; 370/311, 449, 346, 503, 370/389, 338, 349
   See application file for complete search history.

(56) References Cited

U.S. PATENT DOCUMENTS

| | | | |
|---|---|---|---|
| 6,067,297 A * | 5/2000 | Beach | 370/389 |
| 6,907,227 B2 * | 6/2005 | Fujioka | 455/41.3 |
| 2002/0037700 A1 | 3/2002 | Dooley et al. | 455/41 |
| 2002/0193072 A1 | 12/2002 | Alinikula et al. | 455/41 |
| 2003/0231607 A1 * | 12/2003 | Scanlon et al. | 370/338 |

FOREIGN PATENT DOCUMENTS

| | | | |
|---|---|---|---|
| EP | 1 107 522 A1 | 6/2001 | |
| GB | 2 379 365 A | 7/2002 | |
| WO | WO 02/25879 A1 | 3/2002 | |
| WO | WO 02/052793 A1 | 7/2002 | |

OTHER PUBLICATIONS

Balakrishna J. Prabhu et al., "A Routing Protocol and Energy Efficient Techniques in Bluetooth Scatternets", Dept. of Electrical Communication Engineering, Indian Institute of Science, Bangalore 560012, India, 2002 IEEE, pp. 3336-3340.
EPO Communication, Nov. 27, 2006 (6 pgs.).
EP Appln. No. 04253619.3 Communication (Dec. 3, 2004); EP Search Report (Nov. 29, 2004).
EP Appln. No. 04253082.4 Communication (Nov. 15, 2004); EP Search Report (Nov. 3, 2004).

* cited by examiner

*Primary Examiner*—Melur Ramakrishnaiah
(74) *Attorney, Agent, or Firm*—Morgan & Finnegan LLP

(57) ABSTRACT

The present invention relates to systems and methods for a implementing an optimized low-end radio communication protocol, wherein the communication link is flexible and the power consumption characteristics are optimized. One facet of the system's flexibility relates to the system's ability to negotiate device control roles associated with a polling communication link. Also, once the device control roles are in place and the communication link is established, the system selectively implements a number of polling protocols for a multitude of applications that need a low power consumption. In some embodiments the system maintains a communication link with a reduced frequency polling protocol. This type of communication link maintains efficient power consumption characteristics, as well as, connection times that are faster than establishing a communication link between disconnected devices.

68 Claims, 16 Drawing Sheets

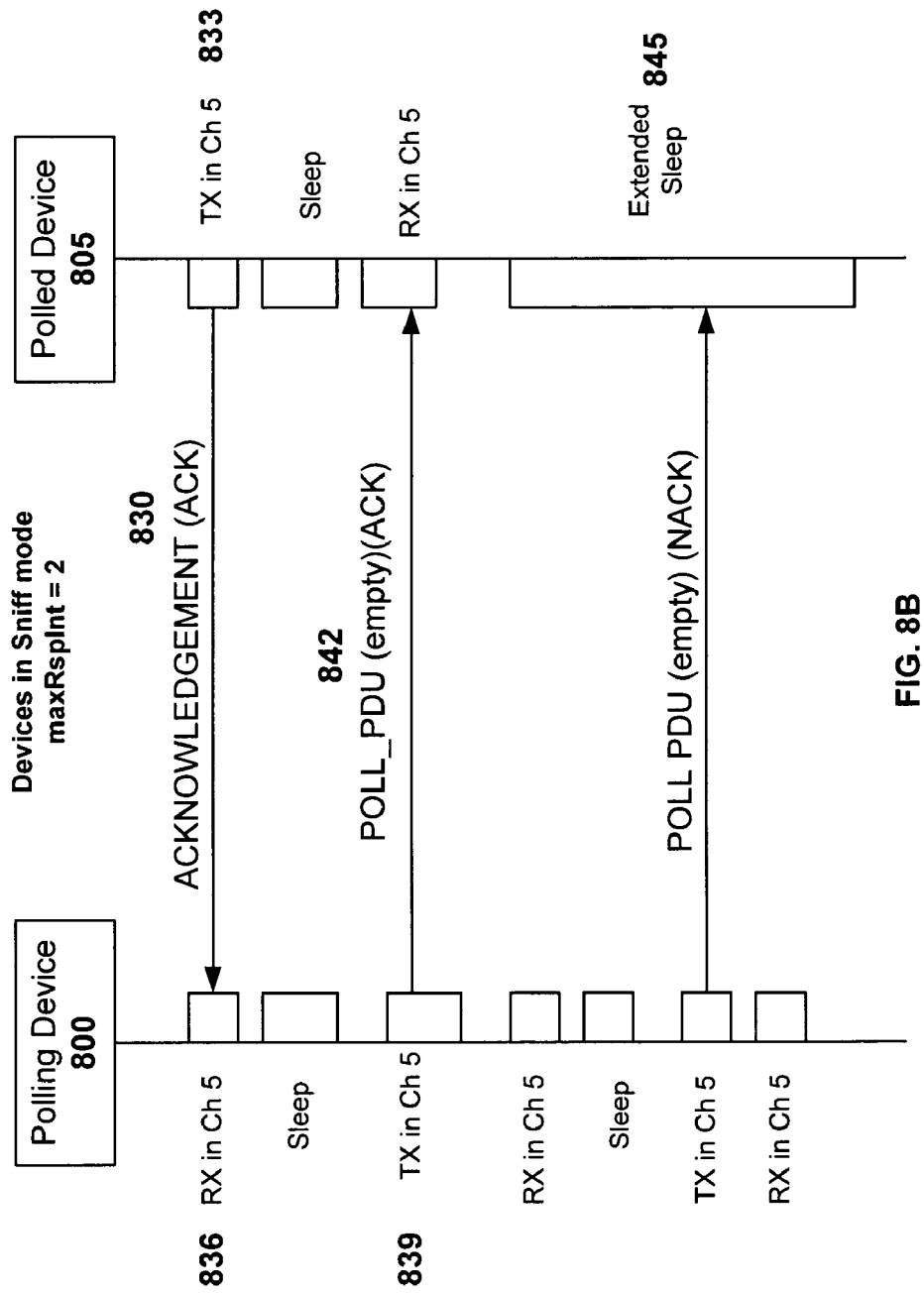
FIG. 8B
Continued from FIG. 8A

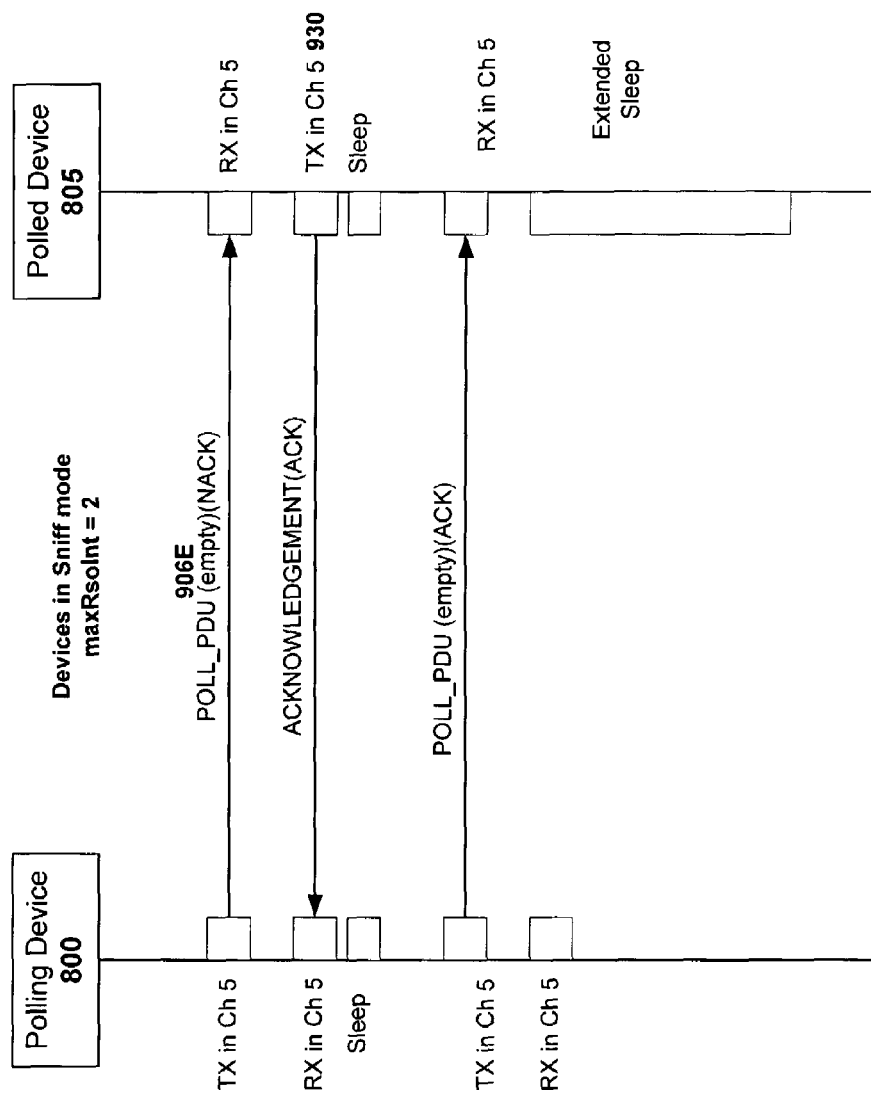
FIG. 9B
Continued from FIG. 9A

CONNECTED MODE FOR LOW-END RADIO

FIELD OF INVENTION

This invention relates generally to establishing a short-range wireless communication link between two or more wireless devices and, more particularly, to methods and apparatus for implementing a communication protocol with optimized power consumption characteristics for communicating with a variety of devices.

BACKGROUND INFORMATION

There are a wide range of systems for establishing and maintaining short range wireless communication links. Many of these systems require a line of sight link, do not support two way communication, do not provide low power consumption characteristics, or flexible connection topologies. Two examples of short range wireless communication protocols are Bluetooth and low-end radio.

As the Bluetooth specification matures, there are a greater number of wireless devices implementing Bluetooth as a standard feature. However, the power consumption requirements and implementation costs make it prohibitive to implement in a host of wireless devices that have low power capacity. Nokia Research Center has developed a radio technology, called low-end radio, which is based on the Bluetooth Specification and may utilize at least the analog parts of the Bluetooth radio, to provide wireless communication links between devices that have limited power resources. The low-end radio protocol enables significant power and cost reductions over Bluetooth wireless devices and accommodates devices having limited power resources.

Low-end radio is discussed in International Publication Number WO 02/073893. The low-end radio protocol enables devices with low power consumption requirements to communicate wirelessly over a certain frequency band. Unlike Bluetooth, low-end radio does not implement a frequency hopping routine or a transmission slot system. This results in a simpler, less complex system than a standard Bluetooth implementation. The low-end radio protocol divides the communication frequency band into a multitude of communication channels.

A device with low-end radio protocol provides more efficient power savings when compared with the standard Bluetooth devices. However, additional power savings would enable low-end radio applications to become even more diverse and widespread. One possible method for reducing power consumption involves implementing low-end radio with Carrier Sensing Multiple Access and collision avoidance.

U.S. patent application Ser. No. 10/224,768, entitled "Carrier Sensing Multiple Access with Collision Avoidance Scheme Optimized For A Priori Known Carrier Usage For Low Duty Systems," (CSMA with collision avoidance) describes systems and methods for a communication system implementing a short range wireless communication link between user devices. The communication system provides a low power solution utilizing an optimized combination of carrier sensing and frequency division multiple access to avoid collisions. The optimization described in that patent application implements a random mean zero value offset appended to a device's transmission frames, when transmissions are sensed on a transmission channel. The offset increases the probability that a first advertising device will recognize another device's transmissions (i.e., determine that a channel is busy) and avoid simultaneous transmissions that result in transmission collisions. Upon recognizing another device's transmissions, the first device may shift its transmission frame to avoid transmission collisions between devices. Consequently, through efficient management of device transmissions, fewer retransmissions are necessary and power consumption is reduced. The carrier sensing communication links may be implemented in either a StandAlone LowRate system, or in a device with a pre-existing Bluetooth implementation.

The Bluetooth specification also has a low-power operating mode that attempts to minimize power consumption. A Bluetooth piconet includes a master and anywhere from one to seven active slaves communicating. Bluetooth implements a frequency hopping system derived from the master's Bluetooth clock signal and the device address. Generally, the hop rate in a normal connection is 1600 hops/s. Transmissions are conducted during specified time slots that are determined according to a predetermined hopping scheme, (e.g., the duration of a time slot is 625 μs). According to the Bluetooth protocol, a Master device may start transmitting only in even-numbered slots, whereas the slave devices may transmit in odd-numbered slots. The data packets may occupy 1, 3 or 5 slots. The whole packet is always transmitted in the same channel. The master polls one slave at the time. Each slave transmits a response message back to the master after receiving the poll. The active slave devices recognize their packets by processing a 3-bit active member addresses in the packet header. Further interaction between a master and a slave depends upon which of three types of master/slave communication links is established.

There are three different communication link types that a master and active slaves in the Bluetooth low power mode may establish: Synchronous Connection-Oriented (SCO) link, Extended Synchronous Connection-Oriented (eSCO) link, and Asynchronous Connection-Less (ACL) link. Synchronous links establish point-to-point links between a master and a single slave in the piconet. A master can manage up to three SCO links by using reserved slots at regular intervals. In SCO links, packets are never retransmitted, whereas eSCO links may have an additional retransmission window after the reserved transmission slots. An ACL link may be a point-to-multi-point link between a master and all of the slaves participating on the piconet. A master can establish an ACL link on a per-slot basis to any slave, in transmission slots not reserved for the synchronous links.

The Bluetooth ACL link implements a system where slaves may enter a sleep state for a predetermined length of time. For example, the Bluetooth protocol implements a low power mode (sniff mode) for slaves which participate on ACL links. Sniff mode reduces the number of the time slots in which the master can start transmission to a specific slave. The master can start transmission only in specified time slots, called sniff slots, which are spaced regularly within a time interval ($T_{sniff}$). The slave in sniff mode starts listening for sniff slots after a predetermined delay ($D_{sniff}$).

Fifteen packet types are defined for data links, for different link types, data, error handling and length. Additionally, there are 5 common packets for control purposes and connection establishment. Each synchronous (voice) channel supports a 64 kb/s data rate in each direction, whereas the asynchronous channel can support a maximum data rate of 723.2 kb/s asymmetric (and still up to 57.6 kb/s in the return direction), or 433.9 kb/s symmetric.

Despite the improved power consumption characteristics associated with implementing low-end radio and Bluetooth's low power mode in coordination with CSMA with collision avoidance, these protocols do not satisfy the power requirements of a multitude of wireless devices and applications with low power requirements.

SUMMARY OF THE INVENTION

The invention is directed to a low power optimized implementation of the low-end radio protocol between at least two wireless devices that may have low power consumption requirements. The low-end radio devices may implement a polling communication protocol between polling and polled devices. The polling communication protocol involves a polling device transmitting a message to a polled device. The polled device, in turn, responds only to the message transmitted from the polling device. The low-end radio optimizations of the present invention involve device polling role switching and can additionally support a reduced duty cycle (low activity mode) during a connected state. The reduced duty cycle enables a decreased power consumption, as well as point-to-multipoint connections between devices.

Specifically, a polling device and a polled device are provided with the option of switching or swapping polling roles. Depending on the application, polling role switching may be executed during the devices establish a communication link. Polling role switching—the ability of the devices to shift the polling device role to the user/advertising device that is less sensitive to power consumption requirements—results in a greater level flexibility, as well as decreased power consumption in the device assuming the polled device role after role switching, when used with an asymmetrical low activity mode.

A second optimization involves a polled device entering an asymmetrical low activity mode, wherein a polled device may selectively determine not to receive and respond to every polling request (e.g., a polling device transmits three polling messages, but the polled device may respond just to the third polling request, and ignore the other two polling requests). The reduction in the number of polled device response transmissions correlates to a reduction in the polled device power consumption.

The foregoing optimizations facilitate either point-to-point or a point-to-multi-point communication topology for short range wireless communication devices, preferably, but not limited to low-end radio devices without adding a great deal of complexity to conventional low-end radio devices. In addition, the reduced duty cycle associated with a polled device decreases the power consumption associated with services with continuous bit streams. Specifically, the symmetrical low activity mode provides power consumption savings in both the polling and polled devices. Asymmetrical low activity mode provides additional power consumption savings for the polled device than symmetrical low activity mode. For example, in a voice connection between a mobile phone and a wireless headset/hearing aid, the headset may implement a low power mode when the operating environment is silent for a predetermined length of time, depending on the application and operating environment. The implementation would extend the headset's battery life, especially in an operating environment where continuous data transfers are not necessary.

Low-end radio does not use the Bluetooth transmission slot system, nor does the low-end protocol implement a frequency hopping routine during the connection. Therefore, low-end radio protocol is not directly comparable to Bluetooth. The optimizations to the low-end radio protocol facilitate a greater flexibility in connection management and enable more efficient power consumption. Specifically, role determination, especially when coupled with asymmetrical low activity mode options improves the power consumption characteristics within short range devices.

Other and further aspects of the invention will become apparent from the following detailed description with reference to the accompanying drawings.

BRIEF DESCRIPTION OF THE DRAWINGS

FIGS. 8A and 8B illustrate an exemplary operational flow diagram of an asymmetrical low activity (sniff) mode, wherein the polled device enters an extended sleep state based on receipt of an acknowledgement from the previous polling sequence.

FIGS. 9A and 9B illustrate an exemplary operational flow diagram of the embodiment shown in FIGS. 8A and 8B, wherein the polled device enters an extended sleep state when the polling device completes a data transfer.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Overview

The optimizations described herein are directed to reducing power consumption, while maintaining communication links between short range wireless devices. Such optimized devices may communicate using a variety of communication protocols. Preferably, one such communication protocol is optimized low-end radio. Generally, devices implementing optimized low-end radio protocol are wireless devices that have a transmitter, a receiver, a processor, memory, and may include any number of either consumer, commercial, or industrial electronic devices.

The communications between devices implementing optimized low-end radio protocol preferably involves two packet structures: identification packets and general packets. In alternate embodiments, the communications between devices may involve other forms of wireless communication, for example analog communications. The general packets are used for data and control information. The same header structure is implemented for all general packets. The payload length is variable, up to 255 bytes. An ID_INFO packet is used to establish connections between local and remote devices within a communication coverage range.

As noted above, the present invention relates to an optimized low-end radio connection protocol for establishing communications with one or more devices, and to the methods, systems, and computer media associated with implementing the optimizations. The optimized low-end radio protocol preferably comprises a system to establish a communication link optimized for low power consumption. Low-end radio (LER) devices may establish a communication link between two LER devices, wherein one LER device assumes a polling device role and the other assumes a polled device role. Advantageously, a LER enabled device is capable of assuming either polling roles.

Figure 1:
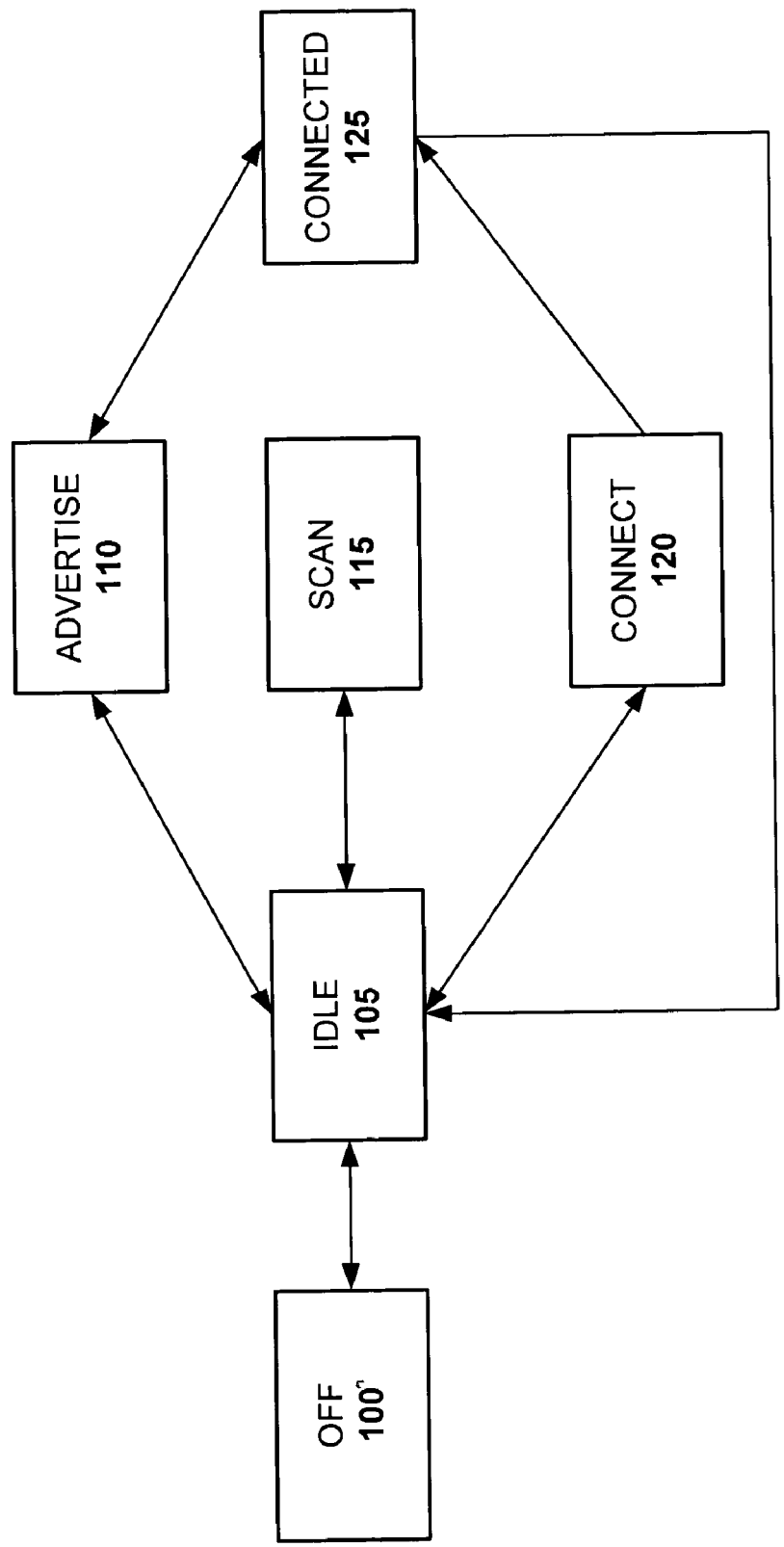
FIG. 1 is a operational mode diagram illustrating the various transitions between operational modes associated with an optimized low-end radio device.

FIG. 1 is a connectivity state diagram illustrating the operational modes of an optimized LER device. A device may initially start in the off mode 100. A user activates the device and transitions the device into the idle mode 105. Depending on the device application, the device may transition from idle mode 105 to an advertise mode 110, scan mode 115, or connect mode 120.

The local device's connectivity mode is application-dependent. The advertise mode 110 makes the local device visible to other devices within a communication coverage range. A local device in the advertise mode may be constrained to communicate with a limited subset of devices. The low-end radio protocol enables the possibility of an application-dependent tradeoff between connection set-up time and power consumption. For example, a device in advertise mode 110 consumes power and time determining whether there are any connectable devices within a coverage area. After determining, that there is at least one desirable connectable device present, the device in advertise mode consumes additional power connecting to any of the user-specified devices. In contrast, a device in connect mode 120 attempts to connect with a specific advertising remote device and does not consume power or time determining whether there are other connectable devices within a coverage area. In scan mode 115, a local device collects addresses and short descriptions from one or more advertising remote devices within a communication coverage range.

When a local device enters the connect mode 120, the local device attempts to establish a point-to-point, bi-directional data delivery with error detection, or Admissions ReQuest message (ARQ). As illustrated in FIG. 1, a local device may, in turn, transition to the connected mode 125 from either the advertise mode or the connect mode. As the connected mode is terminated, the device will either enter the advertise mode or the idle mode. The next mode is selected by an upper layer. A local device in the connected mode 125 may selectively enter a particular operational mode (e.g., an active mode or a low activity mode). The low activity mode (low power mode) may also facilitate a switch from a point-to-point operational topology to a point to multi-point operational topology, for devices that are capable of acting as polling devices in multiple connections.

Figure 2B:
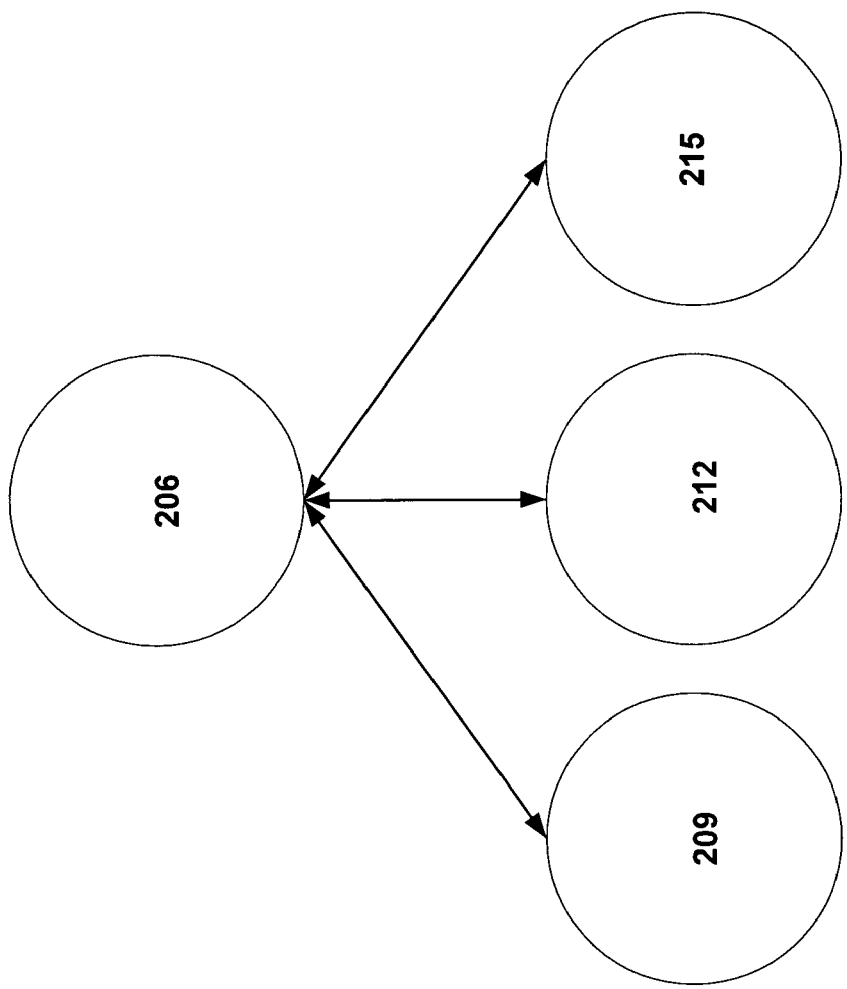
FIGS. 2A and 2B illustrate two distinct optimized low-end radio communication link topologies.
Figure 2A:
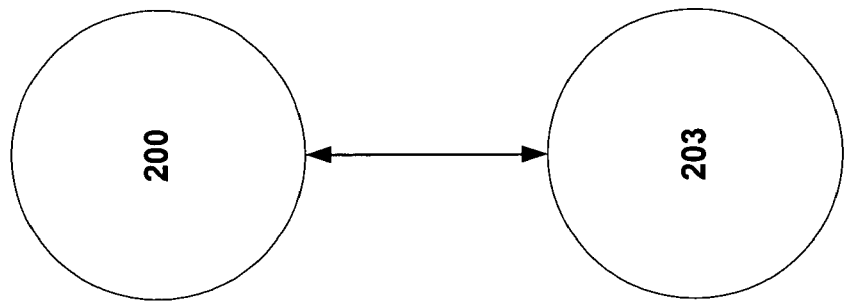

FIGS. 2A and 2B schematically illustrate local devices communicating in a point-to-point operational topology and a point-to-multi-point topology, respectively. As shown in FIG. 2A, the polling device 200 is in the connected mode 125 communicating with polled device 203 in a point-to-point topology. In FIG. 2B, polling device 206 establishes a point-to-multi-point connection topology with polled devices 209, 212, and 215. Generally, in order to facilitate communication management, devices in a point to multi-point connection may implement an asymmetrical low activity polling protocol.

In the present invention, it is to be understood that the operations and functionality illustrated in the figures are accomplished by advertising devices, that advertise data or information for subsequent data transfers, and user devices which receive and process the data or information. It is to be understood that advertising devices and user devices include transmitters, receivers, and processors that are operatively programmed to transmit, receive, and process the messages exchanged between devices, as well as execute the functionality associated with the exchanged messages as disclosed herein, with regard to the figures.

Figure 3:
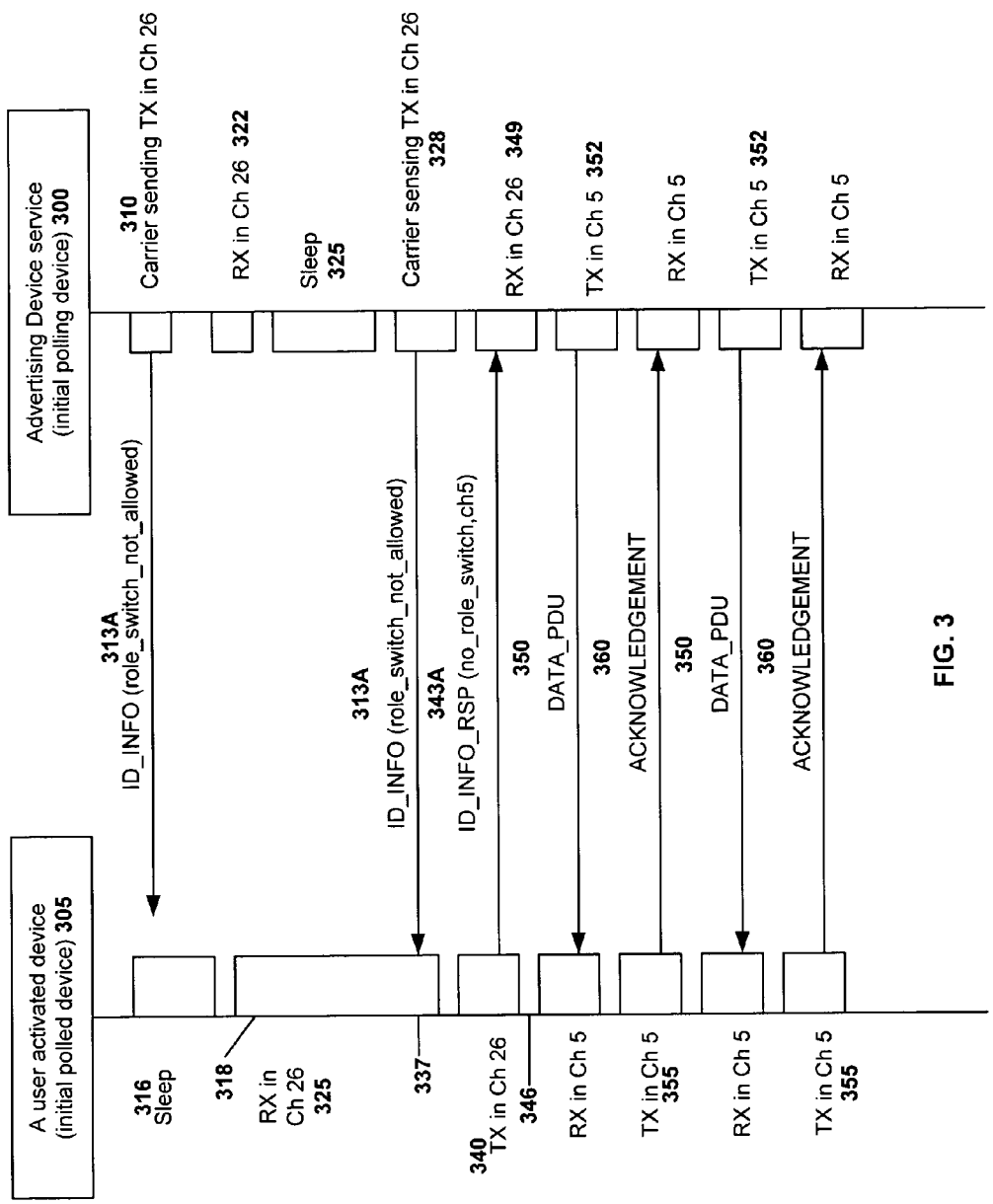
FIG. 3 is an exemplary operational flow diagram of an embodiment of the present invention, in which a polling advertising device attempts to establish a communication link with a polled user device.

For example, two LER devices communicating in a point-to-point topology are capable of negotiating device control roles as the devices establish the communication link. Specifically, to increase power consumption savings, a user device may initiate a polling device role exchange (polling role switching) is enabled, wherein the user device (initial polled device) assumes the role of the polling device and the advertising device (the initial polling device) assumes the polled device role. FIG. 3 illustrates two LER devices establishing a communication link with polling role negotiation disabled, whereas FIG. 4 illustrates the LER devices with polling role negotiation enabled.

The optimized low-end radio protocol divides the range of available communication channels into advertising channels and data transfer channels. By way of example only, a LER device in advertise mode 110 periodically broadcasts an advertising message, ID_INFO, in one of three advertising channels, such as channel 26, as the device advertises its availability to connect. The ID_INFO packet, sent by the polling device 300, contains the lower part of a 64-bit IEEE address and a service field. In turn, the service field may contain information about the device, for example: if the device allows connections to all the devices, if connection to certain devices are restricted, if users may purchase services associated with a LER device, if a particular LER device provides access to the internet, if the upper layer of the protocol stack has updated information, or if the LER device can facilitate polling role switching of connected devices as discussed below.

FIG. 3 also illustrates the operations associated with establishing a communication link between a device (polling device 300) that is advertising data or services and a user device (polled device 305). An advertising device periodically transmits a data message, ID_INFO, that may identify the type of services or information available. In the embodiment illustrated in FIG. 3, the advertising device transmits ID_INFO on a channel designated for advertising a device's availability for connection, (e.g., channel 26). If a user activated device is within communication range of the advertising device, it may respond by transmitting a response data message, ID_INFO_RSP. Some of the data elements within the ID_INFO_RSP packet may include the lower part of the 64-bit IEEE address of the polled device, the request for polling role switching, and/or the data channel to be used for any subsequent data transfers. The request for polling role switching in the ID_INFO_RSP packet is not relevant if there was a corresponding notice in the ID_INFO packet indicating that the advertising device has disabled polling role switching. If the ID_INFO packet does not indicate disabling role switching then the polling switching in the ID_INFO_RSP is relevant. However, the user device does not have to request polling role switching, if it was initially enabled by the advertising device in the ID_INFO packet.

FIG. 3 illustrates an operational flow diagram of two devices establishing a low-end radio communication link wherein polling role switching is disabled. After conducting carrier sensing on advertising channel 26 and determining the absence of conflicting transmissions (310), the polling device 300 transmits the ID_INFO packet 313A. Additionally, in order to conserve power, the devices may conduct carrier sensing before transmitting data once a communication link has been established. The polling device includes a polling role switching indicator within ID_INFO 313A to advise the polled device of the status of polling role switching. As shown in FIG. 3, user device 305 is initially in a sleeping state (316) and therefore ignores the ID_INFO packet 313A transmitted. Accordingly, polling device 300 listens on channel 26 for a response over a predetermined length of time (322), but does not receive a response from the polled device. Before starting the sequence again with carrier sensing (328), the polling device 300 may itself, enter a sleep mode (325) for a predetermined length of time. The user may transition polled device 305, from a sleeping mode into a listening mode (318) (e.g., a user moving a wireless mouse after an period of inactivity). Alternately, the polled device may be programmed to periodically transition between sleep and listening states prior to establishing a communication link. The polled device 305 actively listens for the ID_INFO packet 313A. Coming out of its sleep mode (316), the advertising device repeats carrier sensing and retransmits the ID_INFO packet as 313A (328).

This time the polled user device 305, which now is in the listening mode (318), receives and processes the ID_INFO packet at step (337). In step (340), the polled device 305 prepares and transmits on channel 26, a responding ID_INFO_RSP packet 343A, to acknowledge receipt of the ID_INFO packet 313A. The polled device 305 indicates in ID_INFO_RSP 343A that polling role switching is not enabled and also that subsequent communication should be carried out on a data transmission channel, in this example specifically channel 5. After transmitting the ID_INFO_RSP packet 343A, the polled user device 305 switches to channel 5 (346) and begins listening for any data transmissions from the advertising device. Meanwhile, the polling device 300 receives and processes the ID_INFO_RSP 343A packet and switches to data transmission channel 5 (349), the data transmission channel designated by the polled device 305. At this point, a communication link has been established. Subsequent communications between the polling device 300 and the polled device 305 involve transmitting a data packet, DATA_PDU 350, from the polling device 300 to the polled device 305 at step (352), and the polled device 305 responding by transmitting (355) an acknowledgement 360 on the data transfer channel, channel 5.

Figure 4A:
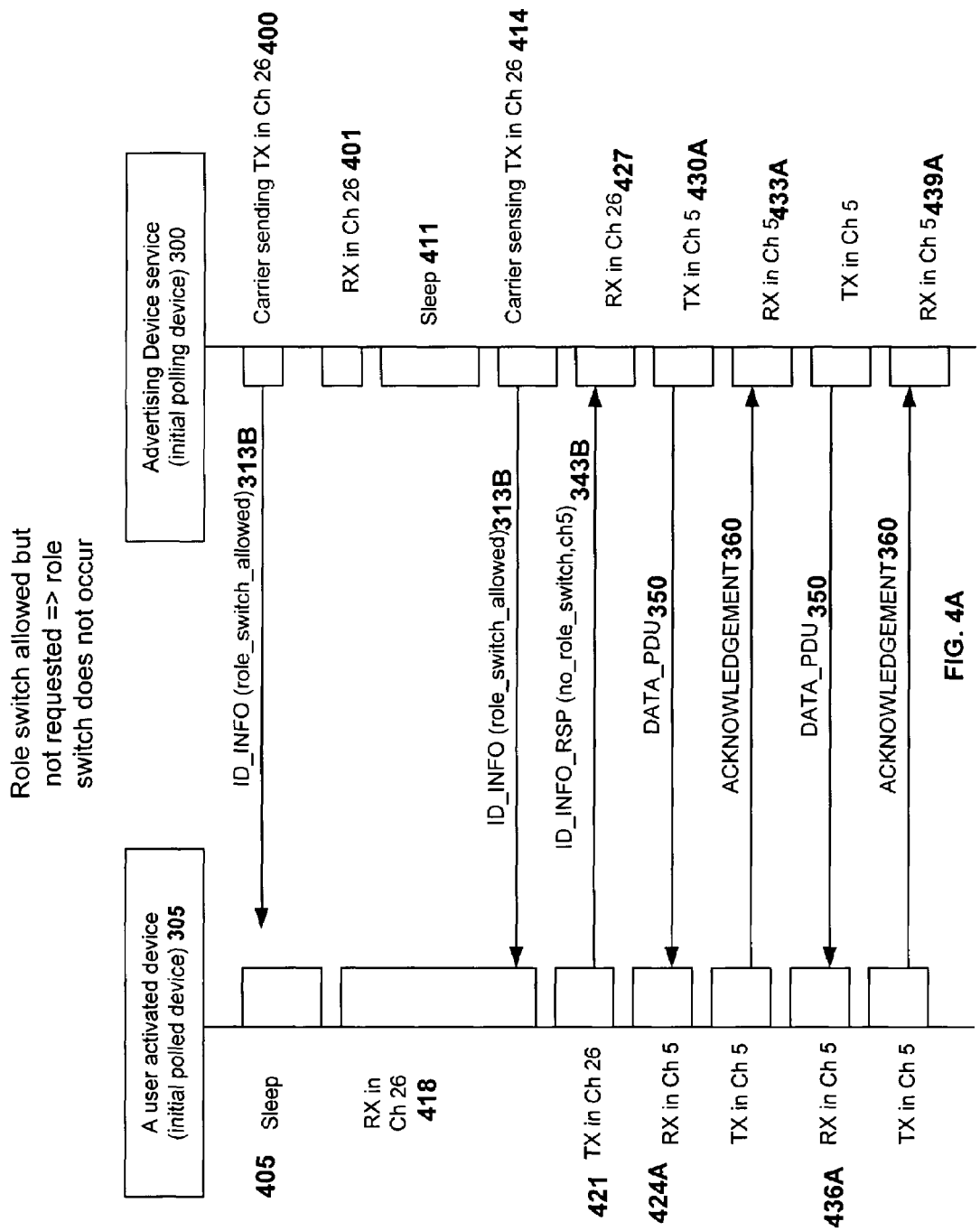
FIGS. 4A and 4B are exemplary operational flow diagrams, wherein device polling role switching is enabled by a polling device, and declined and accepted by a polled device, respectively.
Figure 4B:
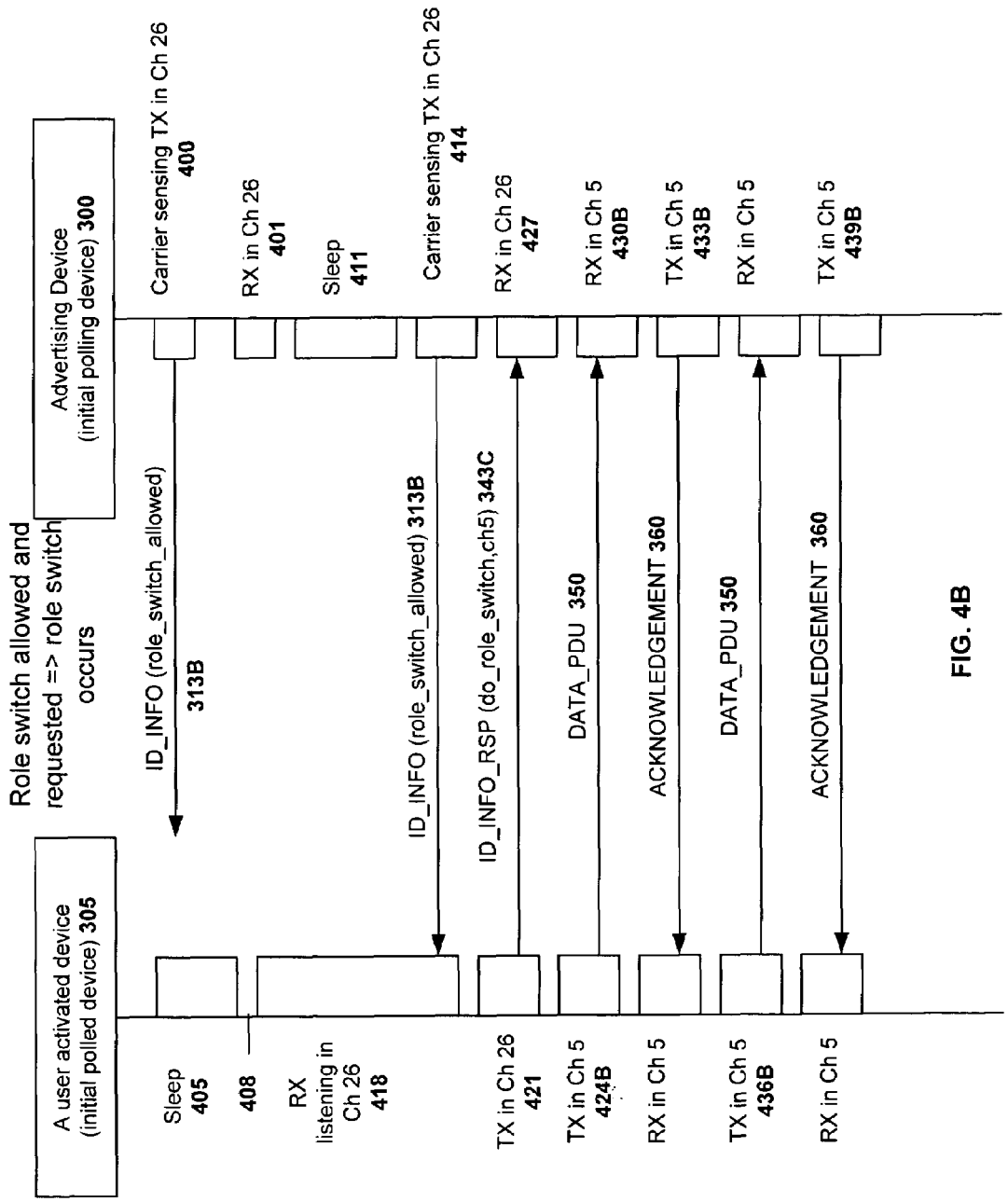

FIGS. 4A and 4B illustrate advertising device 300 and user device 305 establishing a communication link using a similar method as that illustrated in FIG. 3, except that the polling device's ID_INFO packet 313B includes an indicator that polling role switching is enabled. In FIG. 3, packet 313A illustrates the case when role switching is disabled. FIG. 4A illustrates advertising device 300 enabling the polling role switching indicator, whereas user activated device 305 denying polling role switching. In contrast, FIG. 4B illustrates advertising device 300 enabling the polling role switching indicator, while user activated device accepts polling role switching. For the purposes of the example in FIGS. 4A and 4B, advertising device 300 initially assumes the role of the polling device, as before, and user device 305 initially assumes the role of the polled device.

After conducting carrier sensing and determining the channel is clear for transmitting, the advertising device 300 attempts to initiate contact by transmitting the ID_INFO packet 313B on advertising channel 26. The advertising device 300 sets the role_switch_allowed flag in the packet ID_INFO 313B prior to transmission in step 400. After transmitting, the polling device transitions to a listening (receive) state on channel 26 (401). As in FIG. 3, the user device 305 also initially is in a sleep state (405) and therefore does not respond to the ID_INFO packet 313B. Subsequently, the user device 305 transitions during interval 408 from sleep state into a listening state 418. Having received no response from a polled device, the advertising device 300 also enters a sleep state for a predetermined length of time (411), at the end of which it retransmits the ID_INFO packet 313B at step (414). Since the user device 305 is at that particular moment in a listening state, it receives and processes the ID_INFO packet (418).

In the embodiment illustrated in FIGS. 4A and 4B, the advertising device 300 provides the user device 305 with the opportunity to switch roles, wherein the user device may transition from the polled device role to assume the polling device role. Likewise, the advertising device may transition from the polling device role to assume the polled device role.

In FIG. 4A, user device 305 prepares and transmits the ID_INFO_RSP packet 343B on advertising channel 26 (421). In the ID_INFO_RSP packet 343B, user device 305 confirms that subsequent data/service transfers will occur on channel 5. Also, user device 305 indicates in ID_INFO_RSP packet 343B that the devices will not switch roles—user device 305 remains the polled device and advertising device 300 remains the polling device. Accordingly, after receiving and processing ID_INFO_RSP 343B, advertising device 300 prepares and transmits DATA_PDU 350 on the designated data transmission channel in step (427). User device receives DATA_PDU 350 in step (421) and transmits ACKNOWLEDGEMENT 360 in response in step (424). The DATA_PDU/ACKNOWLEDGEMENT exchange process occurs until the communication link is terminated (i.e., the devices exit the connected state).

In FIG. 4B, user device 305 transmits ID_INFO_RSP 343C, indicating that polling role switching is accepted. Accordingly, user device 305, the initial polled device, assumes the role of the polling device by transmitting DATA_PDU 350 in steps (424B) and (436B). Similarly, advertising device 300, the initial polling device, assumes the role of the polled device receiving the DATA_PDU 350 and transmitting ACKNOWLEDGEMENT 360 in steps (433B) and (439B).

As noted earlier, LER devices that have established a wireless communication link and entered the connected state 125 (FIG. 1) may operate in two distinct operation modes—either the active mode, or the low activity mode. The active, or continuous data transfer, mode involves two devices implementing a periodic polling protocol, such as those illustrated in FIGS. 3 and 4. Low activity mode can be further divided into symmetrical low activity mode and asymmetrical low activity mode. An LER device may enter the symmetrical low activity mode, in which the advertising device and the user device enter a sleep state for the same predetermined duration between successive poll/acknowledgement sequences. In the asymmetrical low activity mode, the polling device and the polled device enter sleep states that have different durations. While in the sleep state, the polled device does not respond to a predetermined number of polling messages from the polling device. However, the polled device may respond earlier to the polling messages, if it has data to send.

In other embodiments of the invention, the polling frequency used for either, or both, the active and low activity modes may be either predetermined or dynamically determined. In either event, the devices tune to the data transfer channel, where one device periodically polls the other. In response, the polled device transmits an acknowledgement. This process continues until one of the devices disconnects.

The data transfer and acknowledge transmission steps 352 and 355 in FIG. 3 are operations associated with devices in the active mode wherein, once a communication link is set up, two devices continuously exchange data packets on a data channel according to a polling protocol. Accordingly, the polled device may only transmit packets in response to receiving a transmission from the polling device. As illustrated in FIGS. 3 and 4, the polling device transmits a DATA_PDU packet 350 to the polled device, and the polled device responds by transmitting an ACKNOWLEDGEMENT_PDU packet 360. Both of the packets have the same format and may have a payload up to 255 bytes. If the polled device does not at first acknowledge receiving the DATA_PDU packet 350, as occurs in the protocols of FIGS. 3 and 4, the polling device may retransmit the packet after a predetermined or variable timeout, depending on the application.

Figure 5A:
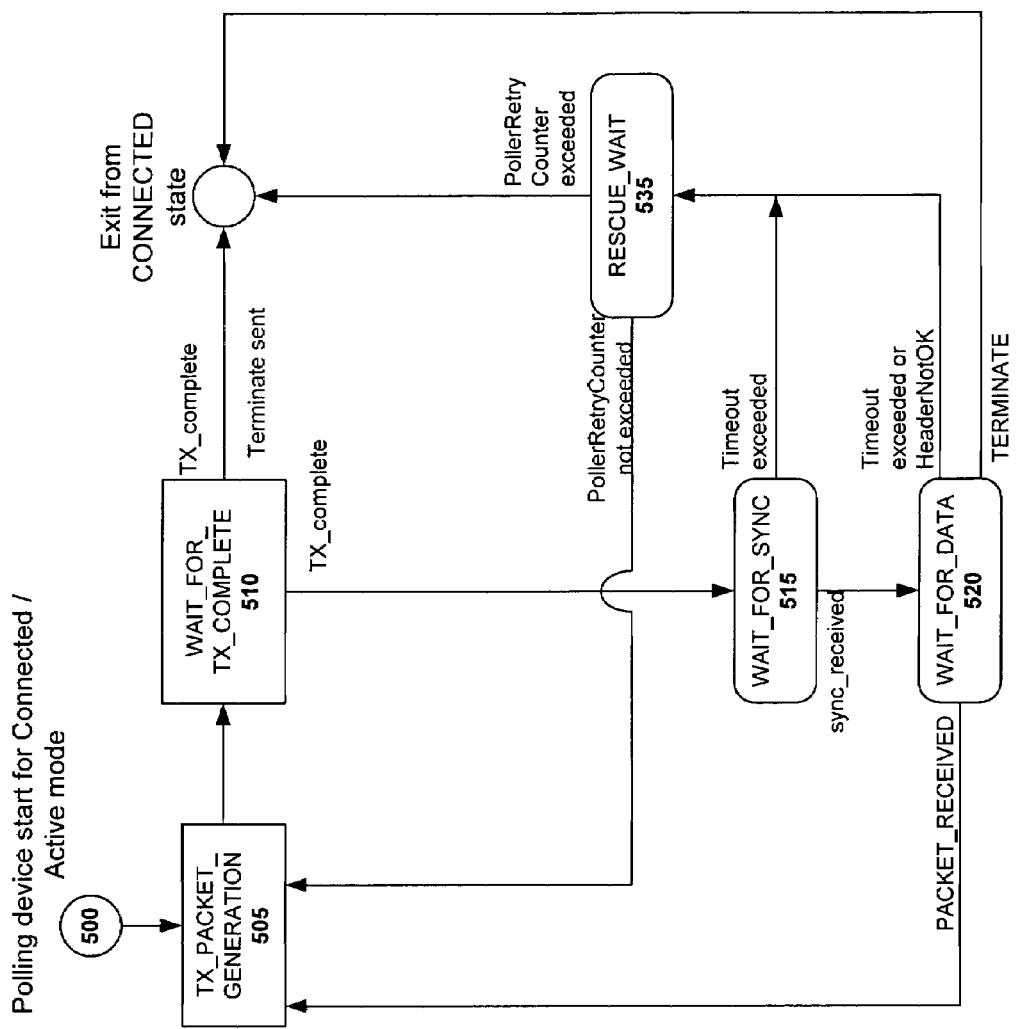
FIGS. 5A and 5B are operational state diagrams of optimized low-end radio devices implementing a continuous data transfer polling protocol for the polling and polled devices, respectively.

Referring to FIG. 5A, the internal operational states through which a polling device 500 transitions in a connected/active mode are depicted. Initially, polling device 500 generates the DATA_PDU packet in the TX_PACKET_GENERATION state 505 and transmits the packet on the data channel during the WAIT_FOR_TX_COMPLETE state 510. If the polling device 500 transmits a terminate message, it may exit from the CONNECTED state. If the polling device 500 transmits a packet other than the terminate message, the polling device 500 may transition to WAIT_FOR_SYNC state 515 and wait to receive packet synchronization bits transmitted from the polled device (550 in FIG. 5B), which are transmitted by the polled device prior to the packet header of the ACKNOWLEDGEMENT_PDU. Once the synchronization bits are received, the polling device 500 transitions to the WAIT_FOR_DATA state 520 to wait for the rest of the acknowledgement packet. If the terminate message has been received, the polling device 500 transitions to exit from CONNECTED state. Otherwise, the polling device 500 transitions to TX_PACKET_GENERATION 505 to transfer additional data.

Figure 5B:
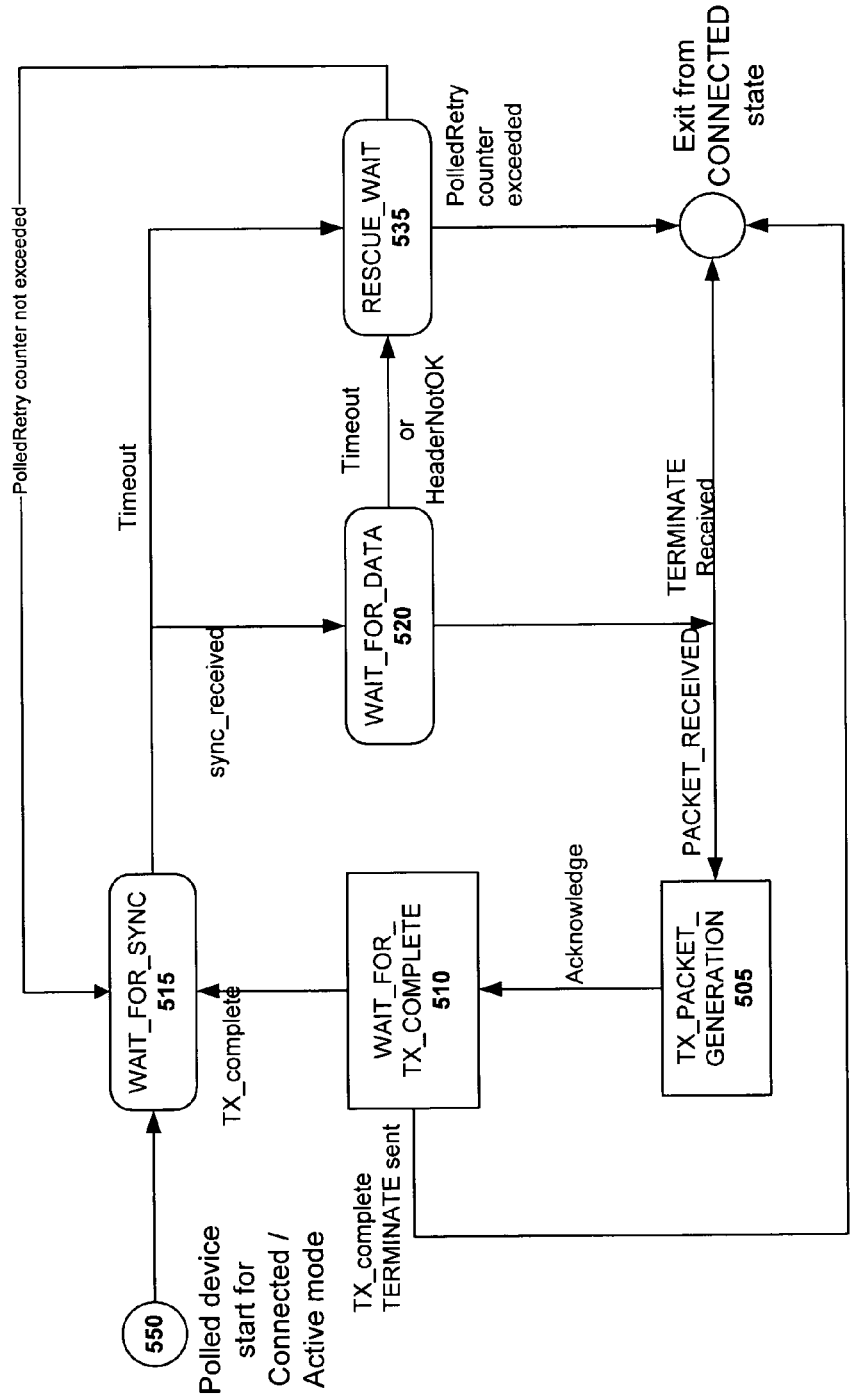

FIG. 5B shows the various states of the polled device 550 in the connected/active mode. Assuming that the polled device 550 is listening for a transmission from another device, it is in the WAIT_FOR_SYNC state 515. In normal operation, the polled device 550 transitions from the WAIT_FOR_SYNC state 515 to the WAIT_FOR_DATA state 520, as with the polling device. Upon receipt of the polling message (e.g., ID_INFO), the polled device 550 transitions to the TX_PACKET_GENERATION 505 state to create an acknowledgement response message, which is transmitted in the WAIT_FOR_TX_COMPLETE state 510. Upon successfully transmitting the acknowledgement message, the polled device 550 then has two options (1) exit from the CONNECTED state, if the polled device transmitted the terminate message, or otherwise, (2) transition back to the initial WAIT_FOR_SYNC state 515 to wait for more data from the polling device 500. If the polled device received a terminate message from the polling device in WAIT_FOR_DATA state, it exits from the CONNECTED state.

FIGS. 5A and 5B also illustrate that the communicating devices incorporate both error detection and recovery states in the connected/active mode. An internal counter is initialized whenever the respective devices enter the WAIT_FOR_DATA or WAIT_FOR_SYNC states. If the counter exceeds a timeout duration, the device has not received the expected packet, or if the packet header is not OK, the device may transition into a RESCUE_WAIT state 535. Device controllers respectively implement two counters to count the sequential non-received packets—(i) PollerRetryCounter 540 and (ii) PolledRetryCounter 541. Each time a device transitions into the RESCUE_WAIT state 535, the corresponding counter is incremented. The counter is reset after successful packet switch. After incrementing the counter's value, the device transitions back to its respective initial state for the particular device, i.e., TX_PACKET_GENERATION 505 for the polling device and WAIT_FOR_SYNC 515 for the polled device. If the counter exceeds a predetermined threshold corresponding to the number of consecutive packets lost, the device exits from the CONNECTED state and terminates the connection. After terminating the connection, the device transitions back to either advertising mode 110 or idle mode 105 (FIG. 1). Otherwise, if the Poller/PolledRetryCounter is not exceeded, a device may transition back to the initial TX_PACKET_GENERATION (FIG. 5A) or WAIT_FOR_SYNC (FIG. 5B). The device transitions back to the mode it was in before entering the connected mode 125.

Figure 6:
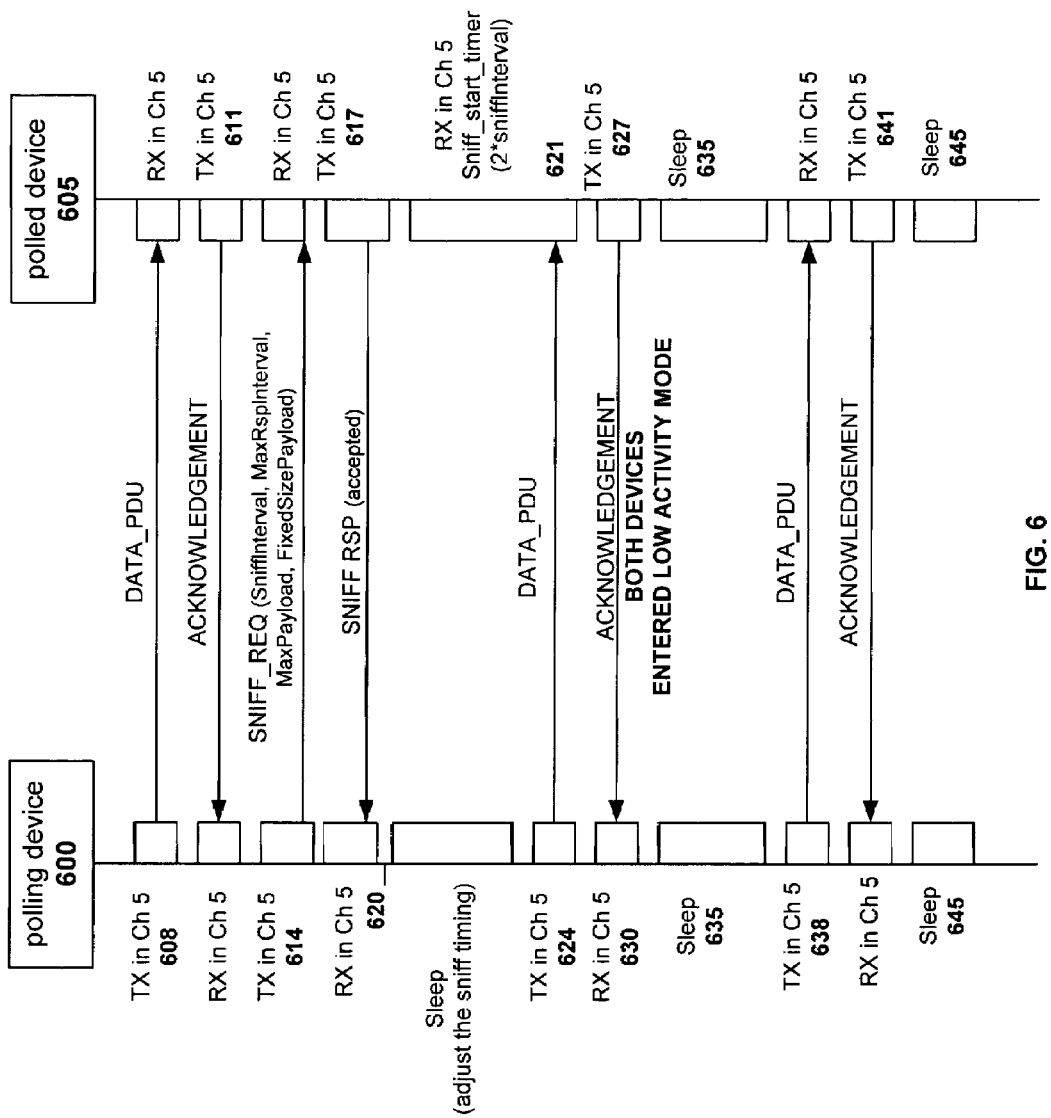
FIG. 6 is an exemplary operational flow diagram illustrating a symmetrical polling protocol in a low activity mode.

Alternately, as illustrated in FIG. 6, a device may be connected and in a low activity mode (sniff mode), which enables a slower, but periodic data packet exchange between connected devices. As will be described below, the greater lengths of time associated with periodic communications between a polling device and a polled device, facilitate maintenance of the communication link, while decreasing power consumption. These embodiments achieve data transfers that are faster than if two unconnected devices have to establish a communication link anew in order to transfer data.

Once the polling roles are established, the devices may transfer the data according to a polling protocol, (e.g. active or continuous data transfer mode, symmetrical low activity mode, or asymmetrical low activity mode). Either the polling device, or the polled device in the active mode, may initiate a transition to the low activity mode. Also, either device may modify the low activity parameters when the devices are in low activity mode. Specifically, to initiate a transition to the low activity mode, a device transmits a sniff request packet, which shares the same general packet format as the packets used in the other operational modes discussed above. The payload, however, contains several low activity mode indicators SNIFFINTERVAL (sniff interval), MAXRSPINTERVAL (maximum response interval), MAXPAYLOAD (maximum payload), and FIXEDSIZEPAYLOAD (fixed size payload). The SNIFFINTERVAL is an 8-bit field defining the polling interval. Depending on the application, the interval may be calculated through an equation, for example, $(2^{\wedge}(x+1)+2*y)*3*0.625$ [ms], where x is the four most significant bits of the field, and y represents the four least significant bits. The MAXRSPINTERVAL is an 8-bit field defining the number of ignorable poll packets (i.e. the number of consecutive polling messages to which the polled device does not need to prepare and transmit a response). The MAXPAYLOAD is an 8-bit field defining the maximum allowable packet payload in bytes during the low activity mode. Finally, the FIXEDSIZEPAYLOAD, a 1-bit field, defines whether or not all of the transmitted and received packets will be the same size. In the event that the FIXEDSIZEPAYLOAD indicator is enabled, the payloads of all packets will correspond to the MAXPAYLOAD value.

FIG. 6 illustrates an operational flow diagram of two devices implementing the symmetrical low activity mode. Initially, a polling device 600 and a polled device 605 may transmit data packets and acknowledgements as shown (608, 611) in the manner previously described. Either device may initiate the transition to the low activity mode (sniff mode). In the embodiment illustrated in FIG. 6, the polling device 600 prepares and transmits to the polled device a low activity (sniff) request (614) containing the parameters discussed above. The polled device 605 prepares and transmits a sniff response accepting the transition request (617).

In accordance with the sniff request and response, the polling device enters a sleep mode to establish the sniff timing (620). The polling device 600 may use this initial sleep period to coordinate the low activity mode connection with polled device 605 and with any other low activity connections that the polling device 600 may be managing. The polled device 605 initiates a low activity mode (sniff) timer and awaits receipt of the first low activity mode transmission (621). Accordingly, the polling device 600 prepares and transmits the first sniff data packet DATA_PDU (624). The data packets may be transmitted according to a fixed-time interval with the interval starting with the completion of the transmission of the polling message. The polled device 605 receives this initial sniff data packet and responds by transmitting an acknowledgement (627). The acknowledgement is received and processed by the polling device 600 (630). The devices have now entered low activity mode, and both enter a sleep mode corresponding to a sniff interval (635). The devices wake from the sleep mode with the polling device 600 conducting a data transfer (638) and the polled device 605 transmitting an acknowledgement (641). After the data transfer/acknowledgement, the devices once again enter the sleep mode (645). The symmetrical sleep states with both devices sleeping for an equal duration are indicative of the symmetrical low activity mode.

Generally, during a low activity mode connection, the device polling roles remain the same as determined during the connection setup. In the low activity mode, the devices may enter a sleep state between completed data transfer/acknowledgement sequences to conserve power. Under the circumstances discussed below, a polled device in an asymmetrical low activity mode may enter an extended sleep state. In order to enter low activity mode, either device may prepare and transmit a new sniff request with a new set of sniff parameters at any time the devices are connected (e.g., after a data transfer has occurred). A sniff request, for example, by setting all of the sniff interval bits to one, may terminate the low activity mode connection. Depending on the application, the connection between devices may be terminated, (i.e., stopped) or the connection may revert to active mode (i.e., continuous data transfer). The connection in low activity mode terminates in a manner similar to the active mode—due to the transmission or reception of a termination message or due to an error condition (no packets received).

Figure 7A:
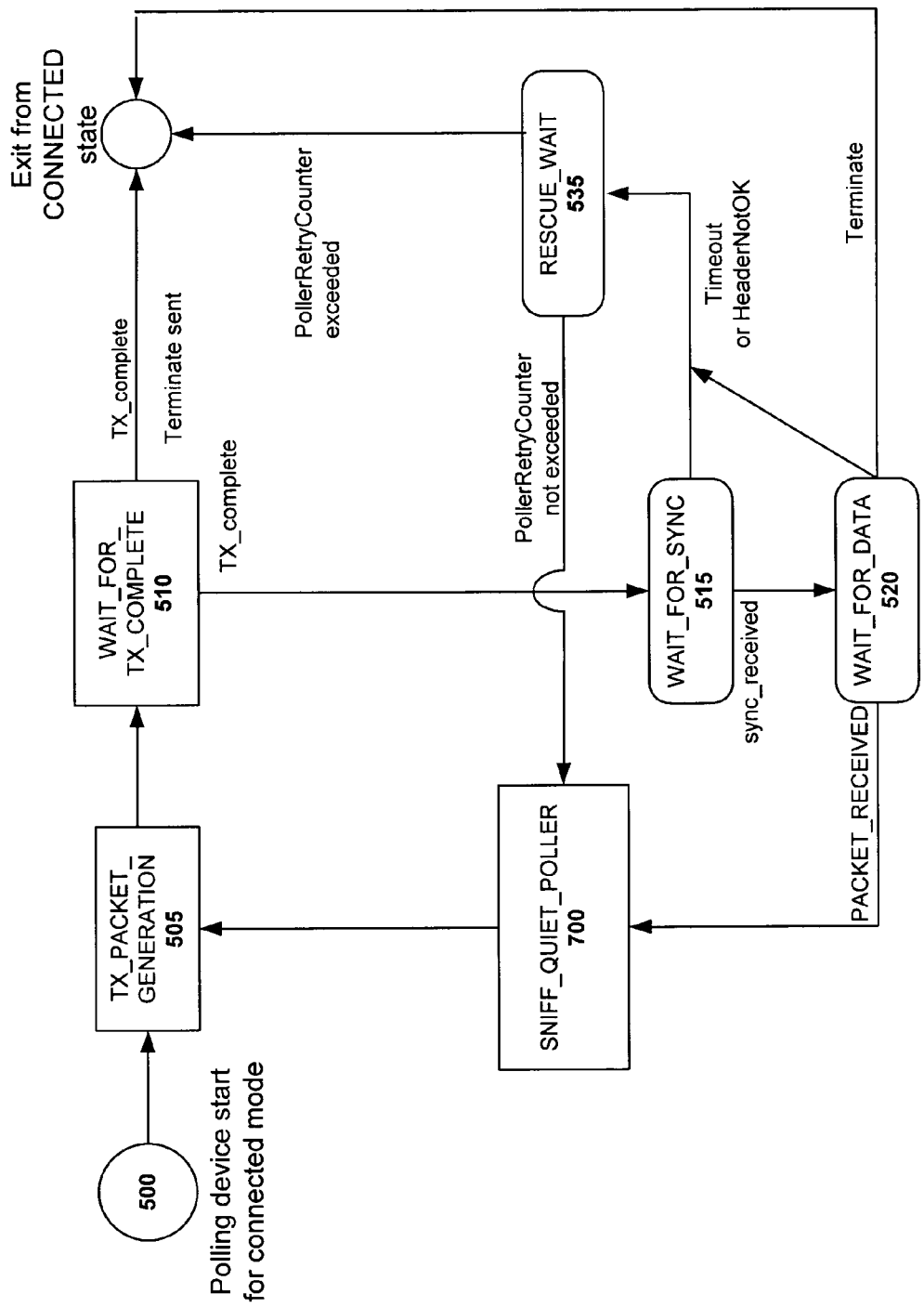
FIGS. 7A and 7B are operational state diagrams of optimized low-end radio devices implementing a low activity mode for the polling and polled devices, respectively.
Figure 7B:
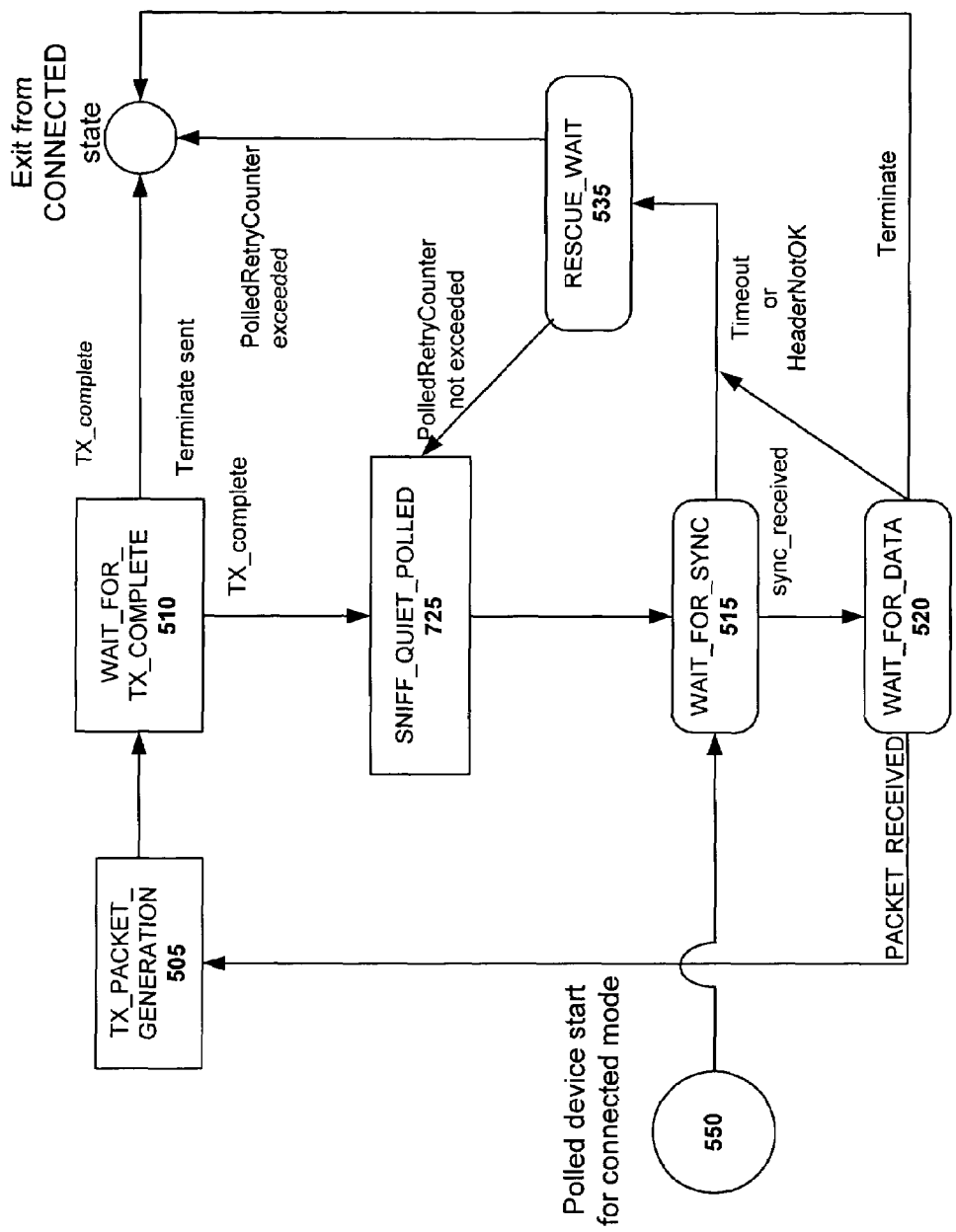

FIGS. 7A and 7B illustrate the operational states and the transitions between states for polling devices in the low activity mode. The states are the same as those discussed in connection with FIG. 6 with the exception of two additional device-specific states—SNIFF_QUIET_POLLER 700 (polling devices) in FIG. 7A and SNIFF_QUIET_POLLED 725 (polled devices) in FIG. 7B. The polling device 500 enters the SNIFF_QUIET_POLLER state 700 in FIG. 7A, after it has received a packet from the polled device, or after the following error cases from the RESCUE_WAIT 535 state: the polling device (1) has received a packet with a bad packet header or (2) timed out while trying to receive a packet from the polled device 550 in WAIT_FOR_DATA 520. In FIG. 7B polled device 550 enters SNIFF_QUIET_POLLED 725, either after it has transmitted its packet in WAIT_FOR_TX_COMPLETE 510, or from the RESCUE_WAIT 535 state if it has not received the polling message. Devices operating in the "SNIFF" state usually enter a sleep mode in the SNIFF_QUIET_POLLED/POLLER states. During low activity mode, the devices may enter the sleep state, or alternately, may establish and maintain connections with other devices. It is easier for the polling device to manage multiple connection. Alternately, if devices are in the low activity mode, the polling device 500 may establish a connection or communicate with another polled device.

The connection in low activity mode terminates in the method described above, for example, by sending a sniff request with all sniff_interval bits set to one, or when a device fails to respond to repeated to polling retransmissions. The device in the RESCUE_WAIT state 535 terminates the connection, if the PollerRetryCounter value shown in FIG. 7A, or the PolledRetryCounter shown in FIG. 7B, exceeds a termination threshold and exits the CONNECTED state. If the counter values do not exceed the termination thresholds, the polling device in FIG. 7A transitions to SNIFF_QUIET_POLLER 700, whereas the polled device in FIG. 7B transitions to SNIFF_QUIET_POLLED 725.

In a symmetrical low activity connection, as illustrated in FIG. 6, the polled device should receive and respond to each polling packet (MAXRSPINTERVAL=0). However, in an asymmetrical low activity connection, the polled device does not have to respond to each polling packet. The number of packets that the polled device may ignore is equal to the value of the MAXRSPINTERVAL sniff parameter. For a low activity device, the polling device increases its polling retry counter only after it has not received a number of responses that corresponds to the value of the MAXRSPINTERVAL.

The symmetrical low activity mode is useful in applications, for example, where the polling device frequently sends control data. In contrast, asymmetrical low activity mode is useful in applications where polled devices do not have periodic data to send or do not need to receive data on a regular basis. Several examples of asymmetrical devices may include wireless mice, keyboards and remote controllers. Generally, these devices transmit data if a user provides a direct input to the device. The inputs may be time critical. Therefore, it is worthwhile to maintain a connection and avoid the time associated with establishing a new connection.

Polling devices, such as personal computers or televisions generally do not rely on low power operability in the same way a wireless mouse or headset would. Accordingly, such polling devices are able to maintain a relatively high polling frequency, so that when the polled device does respond, the data transfer rate is relatively fast, as compared with establishing a new connection and transferring the data.

During asymmetrical low activity mode, there are two instances in which a polled device may not enter an extended sleep state. When the polled device responds to the polling device, the polled device must acknowledge any received additional polling packets if either of two conditions is true (1) the payload packet is not empty or (2) the poll packet contains a negative acknowledgement (NACK). A non-empty Poll PDU payload signifies that the polling device is currently transmitting data. A NACK indicates that the polling device has not received an error free response to previous Poll PDU. If neither of these conditions (payload not empty or NACK) is true, then the polling device has completed the data transfer or has indicated that the acknowledgement sent by the polled device in response to the previous polling message was properly received, and the polled device may now enter an extended sleep state.

Figure 8A:
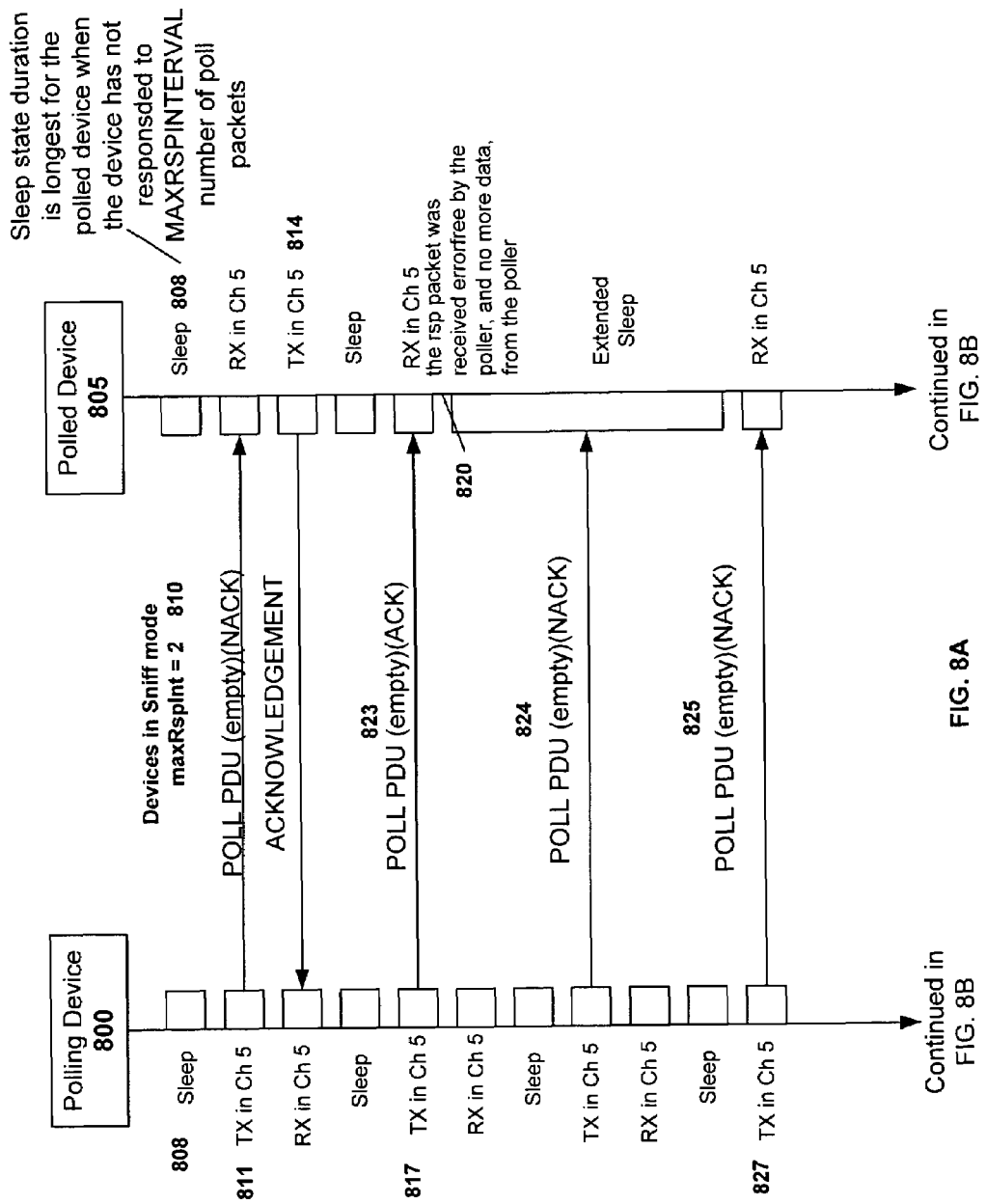

FIGS. 8A and 8B are an operational flow diagram of an asymmetrical low activity mode communication link between polling device 800 and polled device 805. In FIG. 8A, the polling device 800 and polled device 805 are initially in a sleep state 808. In this mode, each device sequences through the transmit (TX), receive (RX), and sleep states, each of which may have a predefined duration. The polled device, however, may extend its sleep periods—in accordance with the parameters agreed upon. Polling device 800 transmits a Poll PDU with an empty payload and a NACK at step (811). As discussed above, the polled device must prepare and transmit an acknowledgement (814), because the NACK indicates that the polled device's response to the previous Poll PDU was not received. The polling device 800 transmits an empty payload in the Poll PDU, but includes a positive acknowledgement indicator (ACK) (817). The ACK indicates that the previous polled device response packet was properly received by the polling device 805. The ACK, in coordination with the empty data payload, enables the polled device 805 to enter an extended sleep state 820, as noted above, during which it ignores a predetermined number 810 (MAXRSPINTERVAL value=2) of polling device Poll PDUs. For example, assuming the MAXRSPINTERVAL value 810 associated with the embodiment illustrated in FIG. 8A is two, the polled device 805 does not have to respond to the two Poll PDUs 823 and 824. However, polled device 805 should be ready to receive and acknowledge the next Poll PDU 825.

Continuing with FIG. 8B, the polled device 805 responds to a third Poll PDU 825 (from FIG. 8A). The polled device 805 transmits the ACKNOWLEDGEMENT 830 (833). The polling device 800 receives at step (836), the ACKNOWLEDGEMENT 830. It thereupon prepares the Poll PDU 842, indicating that the polling device does not have additional data to transfer and that ACKNOWLEDGEMENT 830 was properly received, and transmits Poll PDU 842 at step (839). Since Poll PDU 842 indicates that the payload is empty and the ACKNOWLEDGEMENT 830 was properly received, polled device 805 may enter an extended sleep state 845.

Figure 9A:
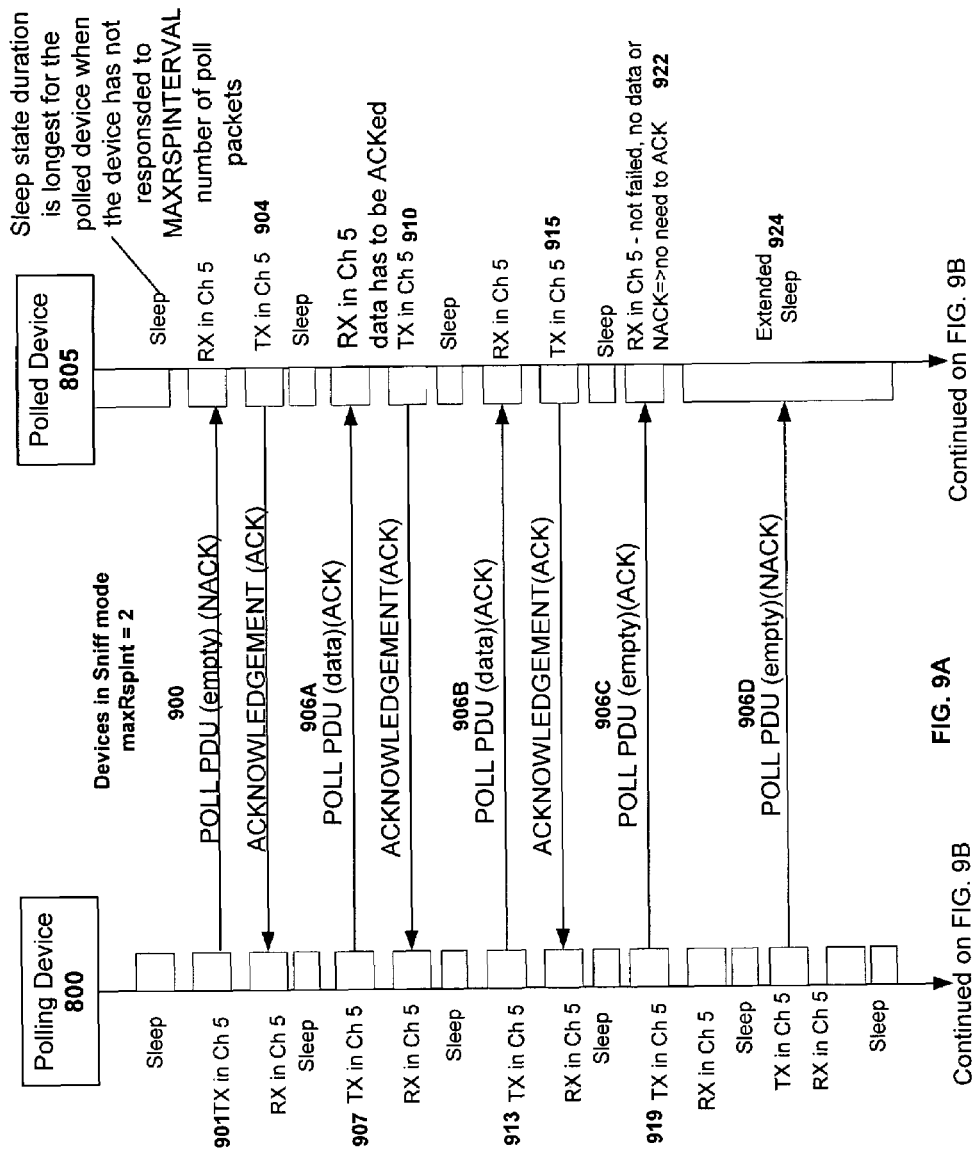

FIGS. 9A and 9B are an operational flow diagram of an asymmetrical polling protocol, where the polled device enters an extended sleep state after the polling device has finished transferring a block of data through two Poll PDU data transfers. Polling Device 800 prepares and transmits a Poll PDU 900, comprising an empty payload, and a NACK (901). Polled device 805 receives the Poll PDU 900, and transmits an ACKNOWLEDGEMENT, as required by the NACK indicator (904).

Polling Device 800 starts a data transfer (907), by transmitting a Poll PDU 906A with data in the payload. Polled device 805 transmits an ACKNOWLEDGEMENT, since data was transferred in Poll PDU 906A (910). Polled device 805 must actively receive any additional data that the polling device 800 may transfer during subsequent Poll PDUs, such as Poll PDU 906B transmitted by the polling device 800 at step 913. After receiving the transferred data, polled device 805 again issues an ACKNOWLEDGEMENT in step 915 and waits for additional data. Assuming polling device 800 transmits Poll PDU 906C with an empty payload at step 919, the polled device 805 processes the Poll PDU 906C at step 922 and determines that Poll PDU 906C has an empty payload and an ACK indicator. Therefore, polled device 805 may enter an extended sleep state (924). According to the MAXRSPINTERVAL value discussed above, the polled device 805 may ignore two Poll PDUs, including 906C and 906D. Thereafter, referring to FIG. 9B, polled device 805 must listen for the next Poll PDU 906E sent on data transfer channel 5. As discussed above, because no acknowledgement to the last Poll PDU was transmitted by the polled device 805, Poll PDU 906E includes a NACK indicator. Therefore, the polled device 805 must in this instance now acknowledge receipt (930).

Figure 10:
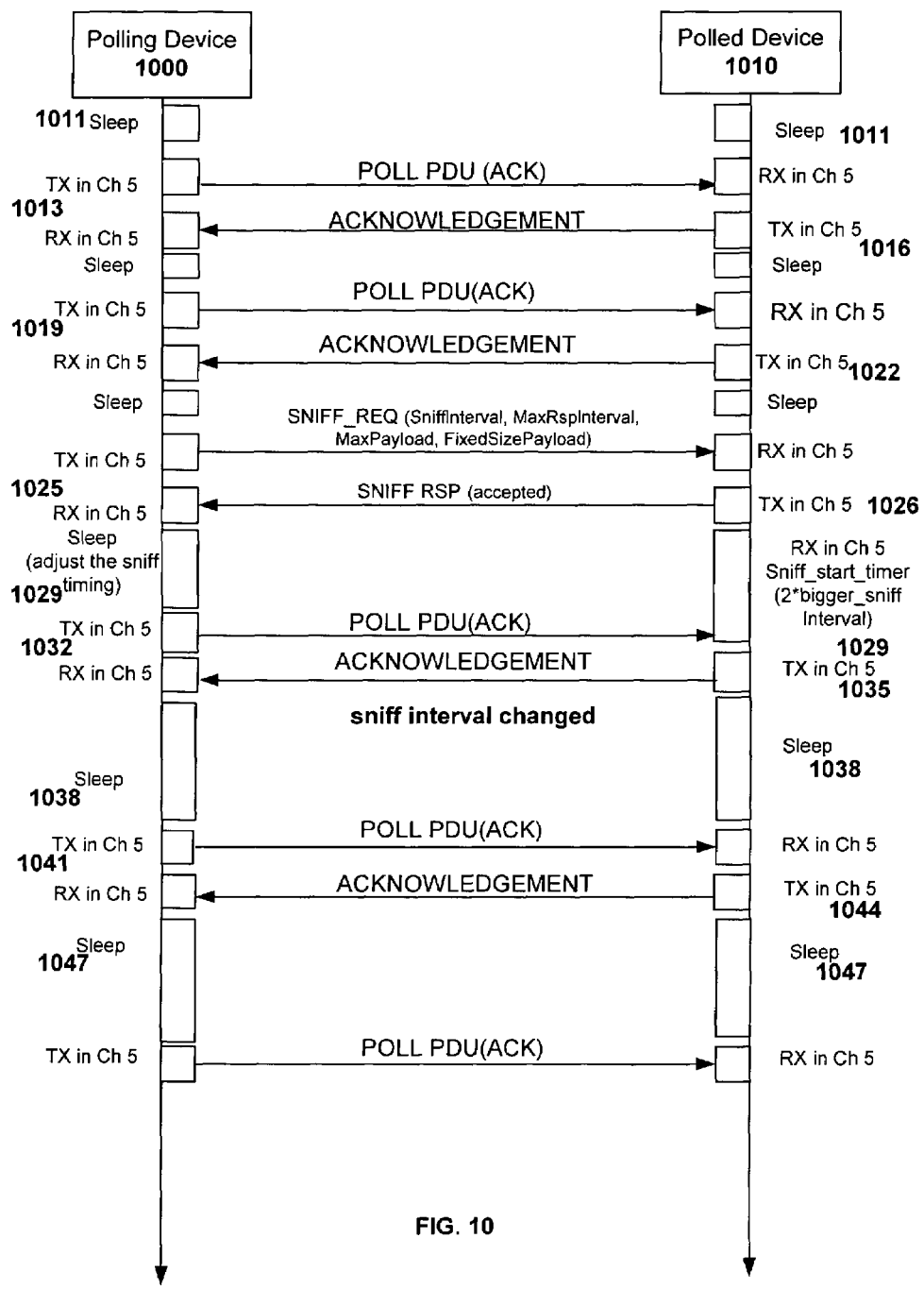
FIG. 10 illustrates an exemplary operational flow diagram, wherein the devices modify the sniff interval.

FIG. 10 illustrates the devices in a symmetrical low activity mode, when the polling device initiates a change in the sniff interval. Polling device 1000 and polled device 1010 are in a symmetrical low activity mode, implementing a sniff interval as shown with sleep state 1011. Polling Device 1000 transmits Poll PDU packets in steps (1013) and (1019), respectively. Polled device 1010 responds, in turn, by transmitting an ACKNOWLEDGEMENT in steps (1016) and (1022). In step (1025), the polling device transmits a sniff request packet including proposed new values for the SNIFFINTERVAL, MAXRSPINTERVAL, MAXPAYLOAD, and FIXED-SIZEPAYLOAD parameters. Polled device 1010, transmits a sniff response in step (1026), accepting the new parameters. The polling device 1000 and polled device 1010, use step (1029) to make the necessary adjustments to the transmission/reception timing to implement the new parameters. Accordingly, polling device transmits a Poll PDU in step (1032), and polled device 1010 responds with an ACKNOWLEDGEMENT in step (1035). Upon transmission of the ACKNOWLEDGEMENT by the polling device 1010 and receipt by the polled device 1000, the devices transition into sleep state 1038 in accordance with the new sniff interval parameters. The devices continue the process of transmitting a Poll PDU, as in step (1041), transmitting a corresponding ACKNOWLEDGEMENT 1044, and entering sleep state 1047.

Figure 11:
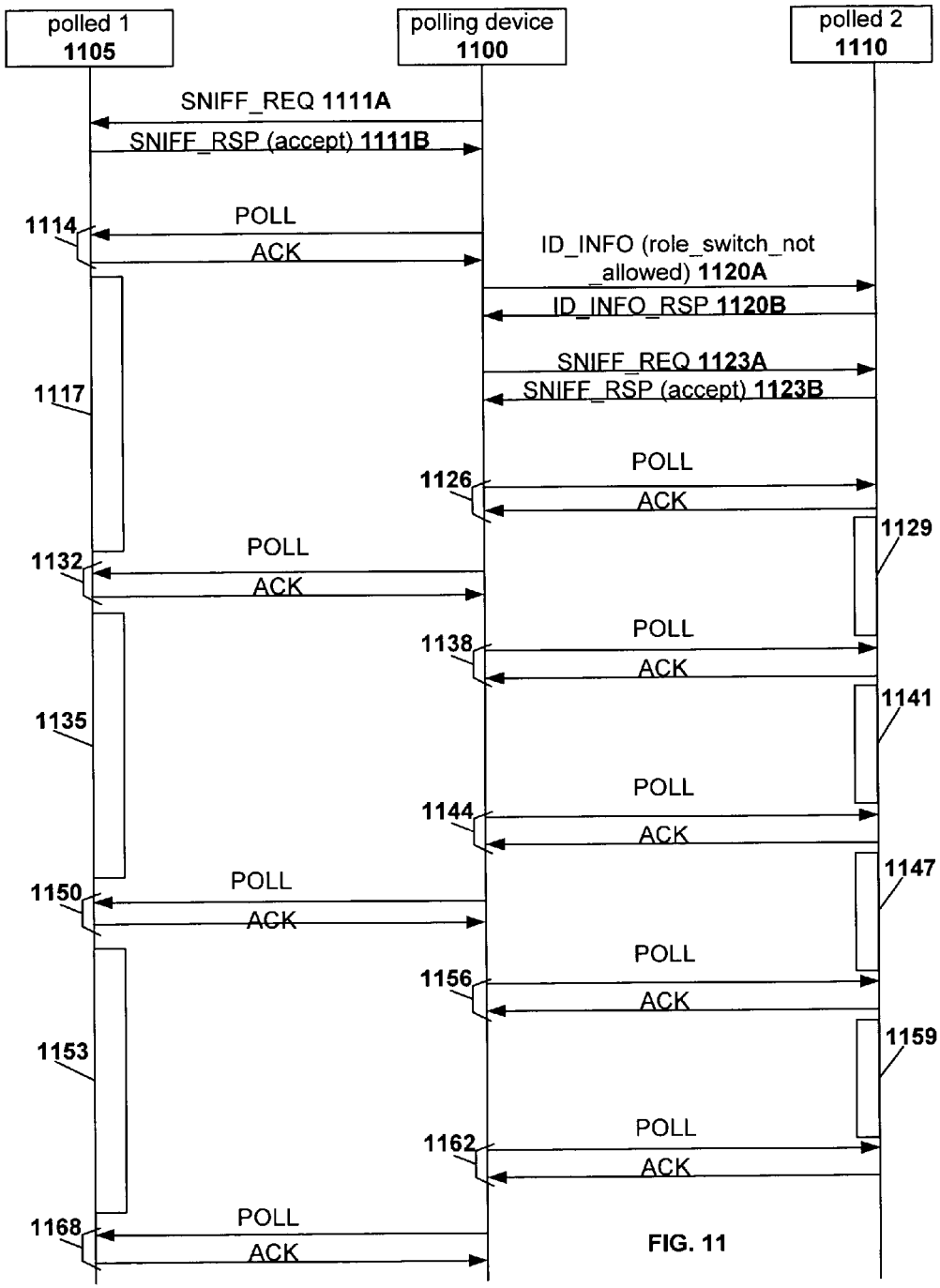
FIG. 11 is an operational flow diagram of a polling device managing multiple communication links in a low activity mode optimized low-end radio devices implementing a low activity mode for the polling and polled devices, respectively.

FIG. 11 illustrates an exemplary embodiment of a low activity mode in the present invention where a polling device manages communications with two polled devices. Polling device 1100 establishes and maintains a communication link with polled devices 1105 and 1110, respectively. As illustrated in FIG. 11, in order to maintain the communication links with multiple devices, the polling device establishes two distinct polling modes.

As illustrated in FIG. 11, polled device 1105 sends sniff request packet 1111A and polling device 1100 responds with sniff response 1111B accepting the sniff parameters, as discussed above. With the sniff parameters for polling device 1100 and polled device 1105 established, the devices exchange the Poll PDU and the ACKNOWLEDGEMENT in step (1114), as described above. After transmitting the ACKNOWLEDGEMENT in step (1114), polled device 1105 enters a sleep state 1117, in accordance with the parameters in the sniff request 1111A. As polled device 1105 sleeps in 1117, polling device 1100 transmits ID_INFO 1120A (with role switching disabled). Polled device 1110 receives ID_INFO 1120A and responds by transmitting ID_INFO_RSP 1120B, requesting a data transfer. The polling device transmits SNIFF_REQ 1123A to establish a low activity mode transfer. As discussed above, SNIFF_REQ 1123A includes the low activity mode timing parameters. In turn, polled device 1110 transmits SNIFF_RSP 1123B accepting the sniff parameters and prepares for the subsequent data transfer.

After the low activity mode operational (sniff) parameters are established between polling device 1100 and polled device 1110, polling device conducts Poll PDU/ACKNOWLEDGMENT exchange 1126. Upon completion of exchange 1126, polled device 1110 enters extended sleep state 1129. When polled device 1110 is in sleep state 1129, polling device 1100 conducts a Poll PDU/ACKNOWLEDGEMENT exchange 1132 with polled device 1105, after polled device 1105 exits extended sleep state 1117. Subsequently, polled device 1105 transitions into sleep state 1135, after transmitting the ACKNOWLEDGEMENT, as part of exchange 1132. Polling device 1100 conducts Poll/Ack exchange 1138 with polled device 1110, after polled device exits extended sleep state 1129.

As illustrated in FIG. 11, polling device 1100 implements a sleep state with a shorter duration with polled device 1110, than with polled device 1105. Accordingly, polled device 1110 exits sleep state 1141 and participates in Poll PDU/ACKNOWLEDGEMENT exchange 1144, while polled device 1105 is still in sleep state 1135. Polling device 1100 manages and maintains multiple data transfers in subsequent Poll PDU/ACKNOWLEDGEMENT exchanges 1150, 1168 with polled device 1105, and exchanges 1156, 1162 with polled device 1110, while the non-active device is in a sleep state 1153 or 1147, 1159, respectively.

From the foregoing exemplary embodiments, it is readily appreciated that the optimized low-end radio protocol provides flexible connectivity attributes, as well as low power consumption characteristics for both polling and polled devices. For instance, in maintaining a communication link in both low activity modes, symmetrical and asymmetrical, a faster data transfer is achieved than found in unconnected devices that must re-establish a communication link before transferring data. Devices implementing the optimized low-end radio protocol's low activity mode may conserve power by periodically entering a sleep state. Devices implementing the low activity mode sleep state in coordination with polling role switching, obtain higher power conservation, since power sensitive devices may delegate or assume the role of polling/polled device.

The embodiments described above are exemplary, and numerous modifications and variations will readily occur to those skilled in the art without departing from the true spirit and scope of the invention. The many features and advantages of the present invention are apparent from the foregoing description of preferred embodiments. It is accordingly intended that all such modifications and variations be comprehended by the appended claims.

We claim:

1. A method, comprising:
    transmitting a broadcast polling message from an advertising device advertising availability for connection for subsequent data transfer, the broadcast polling message including a polling role switching indicator;
    receiving from a user device a response message on the initialization channel including an indication of a data channel different from the initialization channel to be used for subsequent communication between the advertising device and the polling device, and containing a response polling role switching indicator;
    enabling the advertising and user devices to establish a wireless short-range connection on the indicated data channel, wherein polling roles of the advertising and user devices are coordinated in accordance with the response polling role switching indicator, the device in the polling role being enabled to periodically transmit polling messages to the polled device, allowing power to be conserved in the polling device.

2. The method of claim 1, wherein:
    the polling roles of the advertising and user devices are designated in accordance with a predetermined mode if said polling role switching is unavailable.

3. The method of claim 1, wherein:
    the advertising device assumes a polling device role during the connection with the user device.

4. The method of claim 1, wherein:
    the broadcast polling message indicates that polling role switching is available and the response message indicates selecting polling role switching, whereupon the advertising and user devices switch polling roles.

5. The method of claim 1, further comprising:
    specifying in a message transmitted by at least one of the devices, a transmission protocol in which at least one of said devices periodically enters into a finite sleep state in which data is neither transmitted nor received.

6. The method of claim 1, wherein:
    the polling role switching indicators are communicated between the advertising and user devices on a dedicated advertising channel prior to establishing the wireless short range connection.

7. A method, comprising:
    transmitting polling messages on an initialization channel to at least one polled device according to a general polling mode and a request to the at least one polled device to enter a low activity polling mode;
    receiving a response message from the at least one polled device on the initialization channel, containing a response to the low activity mode request and an indication of a data channel different from the initialization channel to be used for subsequent communication between the advertising device and the polling device;
    entering a low activity polling mode, wherein the low activity polling mode starts periodic transmissions of the polling message on the indicated data channel using a time-interval in accordance with parameters in the low activity polling mode request.

8. The method of claim 7, further comprising negotiating the time interval with the at least one polled device between periodic transmissions of polling messages.

9. The method of claim 7, wherein:
    the periodicity of polling message transmissions in the low activity polling mode is specified in the transmitted low activity mode request.

10. The method of claim 7, wherein the general polling mode further comprises:
    the periodicity associated with transmitting the polling messages is defined by a fixed time-interval, wherein said fixed time-interval commences following receipt of said response message.

11. The method of claim 7, wherein the general polling mode further comprises:
    the periodicity associated with transmitting the polling messages is defined by a fixed time-interval, wherein said fixed time-interval commences at the end of a previous polling message, if no response message has been detected.

12. The method of claim 7, wherein:
    the low activity mode is asymmetrical, whereby the at least one polled device abstains from responding to at least one of the polling messages; and a number of polling messages the at least one polled device can abstain from responding to is specified in a parameter defined in the low activity mode request.

13. The method of claim 7, further comprising:
transmitting a message modifying the low activity time-interval after low activity data transfer has occurred.

14. The method of claim 7, further comprising:
conducting carrier sensing multiple access with collision avoidance for determining that there are no transmission conflicts prior to transmitting polling messages.

15. A method, comprising:
receiving a broadcast polling message on an initialization channel from an advertising device advertising available data, the received broadcast polling message including a polling role switching indicator indicating polling role switching availability;
detecting the state of the polling role switching indicator in the polling message by at least one user device;
transmitting a response message from the user device to the advertising device including an indication of a data channel different from the initialization channel to be used for subsequent communication between the advertising device and the user device, and a response polling role switching indicator;
connecting in a communication link on the indicated data channel for subsequent transfer of data, wherein device polling roles are coordinated in accordance with the response polling role switching indicator, the device in the polling role being enabled to periodically transmit polling messages to the polled device, allowing power to be conserved in the polled device.

16. The method of claim 15, wherein:
the transmitted response message indicates that polling role switching is available at the user device and the response message indicates an acceptance of polling role switching, whereupon the advertising and at least one user devices switch polling roles.

17. The method of claim 15, further comprising:
specifying by one of said devices the duration or frequency of a sleep state for at least one of said devices in a low activity mode of operation, wherein the sleep state duration is specified in terms of the number of polling messages that can be ignored by the device in the sleep mode without acknowledging receipt of a polling message.

18. The method of claim 17, wherein:
sleep state characteristics are specified prior to the subsequent data transfer between the devices.

19. The method of claim 15, wherein:
connecting with the advertising device in said communication link by transmitting an acknowledgement in response to receiving the polling message on an advertising channel, wherein the polling message advertises data availability and at least one of said devices specifies a communication channel for subsequent data transmission.

20. The method of claim 15, further comprising:
detecting at one of said devices a received transmission indicating that no additional data will be transmitted by the other device, and
transitioning said one device into a sleep mode upon detecting that no additional data will be transmitted.

21. The method of claim 15, further comprising:
specifying, in a message transmitted by at least one of the devices, a transmission protocol in which at least one of said devices periodically enters into a finite sleep state in which data is neither transmitted nor received.

22. The method of claim 15, wherein:
the polling role switching indicators are transmitted by the advertising and user devices on an advertising channel prior to connecting in the communication link.

23. The method of claim 22, wherein:
the transmitted response message designates a communication channel to be used for the subsequent communication of messages between the devices; and
advertising and user devises each tune to the designated communication channel.

24. The method of claim 23, further comprising:
transitioning at least one of the advertising and user devices to a sleep state between successive data transfers.

25. A system, comprising:
an advertising device, wherein said advertising device is configured to transmit a broadcast polling message advertising availability for connection, the broadcast polling message including a polling role switching indicator;
a user device configured to transmit a response message on the initialization channel in response to receiving said polling message, said response message including an indication of a data channel different from the initialization channel to be used for subsequent communication between the advertising device and the polling device, and containing a response polling role switching indicator; and
said advertising and user devices being operative to connect in a communication link for the subsequent transmission of data, wherein their respective polling roles are coordinated in accordance with the response polling role switching indicator, the device in the polling role being enabled to periodically transmit polling messages to the polled device, allowing power to be conserved in the polled device.

26. The system of claim 25, wherein:
the polling roles of the advertising and user devices are designated in accordance with a predetermined mode if said polling role switching is unavailable.

27. The system of claim 25, wherein:
the advertising device assumes the polling device role during the connection with the user device.

28. The system of claim 25, wherein:
the polling message indicates that polling role switching is available and the response message accepts polling role switching, whereupon the advertising and user devices switch polling roles.

29. The system of claim 25, wherein:
the messages containing the polling role switching indicators are communicated between the polling and polled devices on an advertising channel prior to connecting in the communication link.

30. A system, comprising:
a user device configured to receive data from an advertising device on an initialization channel;
an advertising device configured to transmit data to the user device on the initialization channel;
wherein one of the user and advertising devices assumes a polling device role and the other of said devices assumes a polled device role;
said polling device being configured to transmit polling messages to the polled device according to a general polling mode and to transmit a request to the polled device to enter a low activity polling mode and an indication of a data channel different from the initialization channel to be used for subsequent communication between the advertising device and the polling device; and said polled device being configured to transmit a response message in response to the receipt of said request from the polling device indicating an acceptance or rejection of the polling device request to enter a low activity polling mode on the indicated data channel, the polling and polled devices thereupon connecting in a communication link;

said polling and polled devices being further configured to enter a low activity polling mode on the indicated data channel, upon acceptance thereof by the polled device the low activity polling mode involving the periodic transmission of polling messages by the polling device.

31. The system of claim 30, wherein:
the polling and polled devices are further operative to negotiate an interval between periodic transmissions of polling messages; and
the periodicity of polling message transmissions involved in the low activity polling mode is specified in the transmitted low activity polling mode request.

32. The system of claim 30, wherein:
the periodicity of polling message transmissions is defined by fixed time-intervals between transmissions, said transmissions commencing following receipt of said response message by the polling device.

33. The system of claim 30, wherein:
the periodicity of polling message transmissions is defined by fixed time-intervals between transmissions, said transmissions commencing at the end of the transmission a previous polling message if no response message has been detected.

34. The system of claim 30, wherein the low activity mode is asymmetrical, whereby the polled device abstains from responding to at least one of said polling messages.

35. The system of claim 30, wherein the number of polling messages to which the polled device can abstain from responding is specified in a parameter defined in the low activity mode request.

36. The system of claim 30, wherein:
one of the polling device and the polled device is operative to transmit a request message to modify parameters associated with the low activity time-interval after low activity data transfer has occurred.

37. The system of claim 30, wherein:
the polling device conducts carrier sensing multiple access with collision avoidance and determines that there are no transmission conflicts prior to transmitting broadcast polling messages.

38. A system, comprising:
an advertising device configured to advertise availability of data for subsequent data transfer on an initialization channel;
a user device operative to receive advertisements on the initialization channel and request subsequent data transfers, wherein one of the advertising device and the user device assumes a polling device role and the other of the advertising device and the user device assumes a polled device role;
the user device receiving a broadcast polling message from the advertising device, wherein said broadcast polling message includes an indication of a data channel different from the initialization channel to be used for subsequent communication between the advertising device and the polling device and a polling role switching indicator;
the user device detecting the state of the polling role switching indicator in the polling message and transmitting a response message containing a response polling role switching indicator on the initialization channel; and
said devices connecting in a communication link for subsequent data transfer on the indicated channel, wherein device polling roles are determined in accordance with the response polling role switching indicator.

39. The system of claim 38, wherein:
the response polling role switching indicator in the response message indicates that polling role switching is unavailable.

40. The system of claim 38, wherein:
the broadcast polling message indicates that polling role switching is available and the response message indicates an acceptance of polling role switching, whereupon the advertising and user devices switch polling roles.

41. The system of claim 38, wherein:
one of the advertising device and the user device specifies a low activity mode of operation wherein the duration or frequency of a sleep state for at least one of the advertising device and the user device is communicated to the other of the advertising device and the user device; and
the sleep state duration is specified in terms of the number of polling messages a device assuming the polled device role can ignore without acknowledging receipt of a polling message.

42. The system of claim 38, wherein:
the polled device receives a transmission indicating that no additional data will be transmitted by the polling device, and
the polled device transitions into a sleep mode upon processing said transmission that no additional data will be transmitted.

43. The system of claim 38, wherein:
one of the polling device or polled devices specifies a transmission protocol in which at least one of said devices periodically enters into a finite sleep state in which data is neither transmitted nor received.

44. The system of claim 38, wherein:
the advertising device and user devices transmit the polling role switching indicator and the response polling role switching indicator, respectively on an advertising channel prior to connecting to in a communication link.

45. The system of claim 38, wherein:
one of the advertising device and user devices designates a communication channel to be used for the subsequent communication of messages between devices; and
the advertising device and user devices tune to the designated communication channel.

46. The system of claim 38, wherein:
at least one of the polled device and the polling device transition to a sleep state between successive data transfers.

47. The system of claim 38, wherein:
one of the polling device and the polled device specifies sleep state characteristics prior to a data transfer.

48. An apparatus, comprising:
a transmitter and receiver configured to transmit and/or receive messages by short range radio communication; and
a processor configured to cause the apparatus to:
transmit a broadcast polling message on an initialization channel advertising availability for connection to a user device;

receive from any responding user device a response message on the initialization channel including at least an indication of a data channel different from the initialization channel to be used for subsequent communication between the advertising device and the polling device;

detect any polling role switching indicator contained in such response message; and establish a wireless short range communication link for the subsequent transfer of data, wherein the polling roles in the communication link are coordinated in accordance with the detected response polling role switching indicator, the device in the polling role being enabled to periodically transmit polling messages to the polled device, allowing power to be conserved in the polling device.

49. The communication device of claim 48, wherein:
the broadcast polling message includes a polling role switching indicator the polling role switching indicator indicating polling role switching availability.

50. The communication device of claim 48, wherein:
the communication device adopts a default polling role if no indicator of the of polling role switching availability is detected.

51. The communication device of claim 48, wherein:
the communication device repetitively cycles through operational states including transmit, receive and sleep states.

52. The communication device of claim 48, wherein:
the polling role switching indicators are communicated in transmissions from the communication device on an advertising channel prior to establishing a communication link with a user device.

53. An apparatus, comprising:
a transmitter and receiver configured to transmit and/or receive messages by short range radio communication; and
a processor configured to cause the apparatus to:
transmit polling messages on an initialization channel to at least one user device according to a general polling mode;
transmit a low activity polling mode request including at least an indication of a data channel different from the initialization channel to be used for subsequent communication to the at least one user device;
enter the low activity polling mode on the indicated data channel upon the receipt of a response message from the at least one user device accepting a low activity mode request, the low activity polling mode involving the periodic transmission of polling messages by the polling device.

54. The communication device of claim 53, wherein:
the low activity polling mode uses a time interval specified in the transmitted low activity mode request.

55. The communication device of claim 53, wherein the general polling mode further comprises:
the periodicity associated with transmitting polling messages is defined by a fixed time-interval, wherein said fixed time-interval commences following receipt of said response message.

56. The communication device of claim 53, wherein the general polling mode further comprises:
the periodicity associated with transmitting the polling messages is defined by a fixed time-interval, wherein said fixed time-interval commences at the end of a previous polling message, if no response message has been detected.

57. The communication device of claim 53, wherein:
the low activity mode is an asymmetrical whereby, said processor is programmed to cause said communication device to:
continue polling attempts in accordance with the parameters in the low activity polling mode, if the at least one user device does not respond to the polling messages.

58. The communication device of claim 53, wherein:
the number of polling messages which the polling device will continue transmitting without receiving a response from the polled device is specified in a parameter included in the low activity mode request.

59. The communication device of claim 53, wherein:
the communication device conducts carrier sensing multiple access with collision avoidance and determines that there are no transmission conflicts prior to transmitting messages.

60. An apparatus, comprising:
a transmitter configured to transmit and/or receive messages by short range radio communication; and
a processor configured to cause the apparatus to:
receive a polling message from an advertising device on an initialization channel;
detect in the received message any polling role switching indicator;
transmit a response message to the advertising device request including at least an indication of a data channel different from the initialization channel to be used for subsequent communication and containing a response polling role switching indicator; and
connect in a communication link for subsequent data transfer with the advertising device on the indicated data channel, wherein the polling role of the communication device in the communication link is determined in accordance with the response polling role switching indicator.

61. The communication device of claim 60, wherein:
the response message indicates both polling role switching is available and an acceptance of polling role switching, whereupon the communication device assumes the polling device role.

62. The communication device of claim 60, wherein said processor is further programmed to cause said communication device to:
specify the duration or frequency of a sleep state for the communication devices in a low activity mode of operation; and
the sleep state duration is specified in terms of the number of polling messages that can be ignored in the sleep state without acknowledging receipt of a polling message.

63. The communication device of claim 60, wherein said processor is further programmed to cause said communication device to:
connect in said communication link with the advertising device by transmitting an acknowledgement in response to receiving the polling message on an advertising channel, wherein the polling message advertises data availability and at least one of the communication device or the advertising device specifies a communication channel for subsequent data transmission.

64. The communication device of claim 60, wherein said processor is further programmed to cause said communication device to:
detect a received transmission indicating that no additional data will be transmitted by the advertising device, and transition said communication device into a sleep mode upon detecting that no additional data will be transmitted.

65. The communication device of claim 60, wherein said processor is further programmed to cause said communication device to:

specify a transmission protocol in which at least one of the communication device and the advertising periodically enters into a finite sleep state in which data is neither transmitted nor received.

66. The communication device of claim 60, wherein said processor is further programmed to cause said communication device to:

designate in the transmitted response message a communication channel to be used for the subsequent data transfer; and tune to the designated communication channel.

67. The communication device of claim 60, wherein said processor is further programmed to cause said communication device to:

transition said communication device to a sleep state between successive data transfers.

68. The communication device of claim 60, wherein:

sleep state characteristics are specified prior to a data transfer connection to the communication link.

* * * * *

UNITED STATES PATENT AND TRADEMARK OFFICE
CERTIFICATE OF CORRECTION

PATENT NO.        : 7,515,945 B2                                    Page 1 of 1
APPLICATION NO.   : 10/610990
DATED             : April 7, 2009
INVENTOR(S)       : Paivi M. Ruuska et al.

It is certified that error appears in the above-identified patent and that said Letters Patent is hereby corrected as shown below:

In column 18, line 11: change "claim 23" to --claim 22--

Signed and Sealed this

Fourth Day of August, 2009

JOHN DOLL
*Acting Director of the United States Patent and Trademark Office*